(12) United States Patent
Ikeuchi et al.

(10) Patent No.: US 6,643,584 B1
(45) Date of Patent: Nov. 4, 2003

(54) MAP INFORMATION PROCESSING APPARATUS AND MAP INFORMATION TRANSMISSION CENTER

(75) Inventors: Tomoya Ikeuchi, Tokyo (JP); Masaharu Umezu, Tokyo (JP); Makoto Mikuriya, Tokyo (JP); Mitsuo Shimotani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/359,661

(22) Filed: Feb. 7, 2003

(30) Foreign Application Priority Data

Aug. 21, 2002 (JP) ........................................ 2002-240768

(51) Int. Cl.⁷ .............................................. G01C 21/00
(52) U.S. Cl. ........................ 701/209; 701/208; 340/988
(58) Field of Search ................................ 701/209, 208, 701/210, 200, 207; 340/988, 990

(56) References Cited

U.S. PATENT DOCUMENTS 5,293,163 A * 3/1994 Kakihara et al. ...... 340/995.13
6,111,539 A * 8/2000 Mannings et al. ...... 342/357.09
6,278,939 B1  8/2001 Robare et al. ............... 701/208
2002/0091485 A1 7/2002 Mikuriya et al. ........... 701/208

FOREIGN PATENT DOCUMENTS

JP   2000-121371   4/2000

* cited by examiner

Primary Examiner—Marthe Y. Marc-Coleman
(74) Attorney, Agent, or Firm—Leydig, Voit & Mayer, Ltd.

(57) ABSTRACT

A map information processing apparatus includes a route determination unit for determining a route between two arbitrary points by using map information for route determination having one or more levels of hierarchy, and an external map information acquiring unit for, when acquiring map information about a predetermined region from outside the map information processing apparatus, acquiring map information for route determination result providing having information about a region of an arbitrary size including the predetermined region, and map information for route determination about at least one unit region including the predetermined region, which is included in map information for route determination at the top level of the hierarchy, and map information for route determination about all unit regions that exist at levels of the hierarchy lower than the former unit region including the predetermined region.

21 Claims, 38 Drawing Sheets

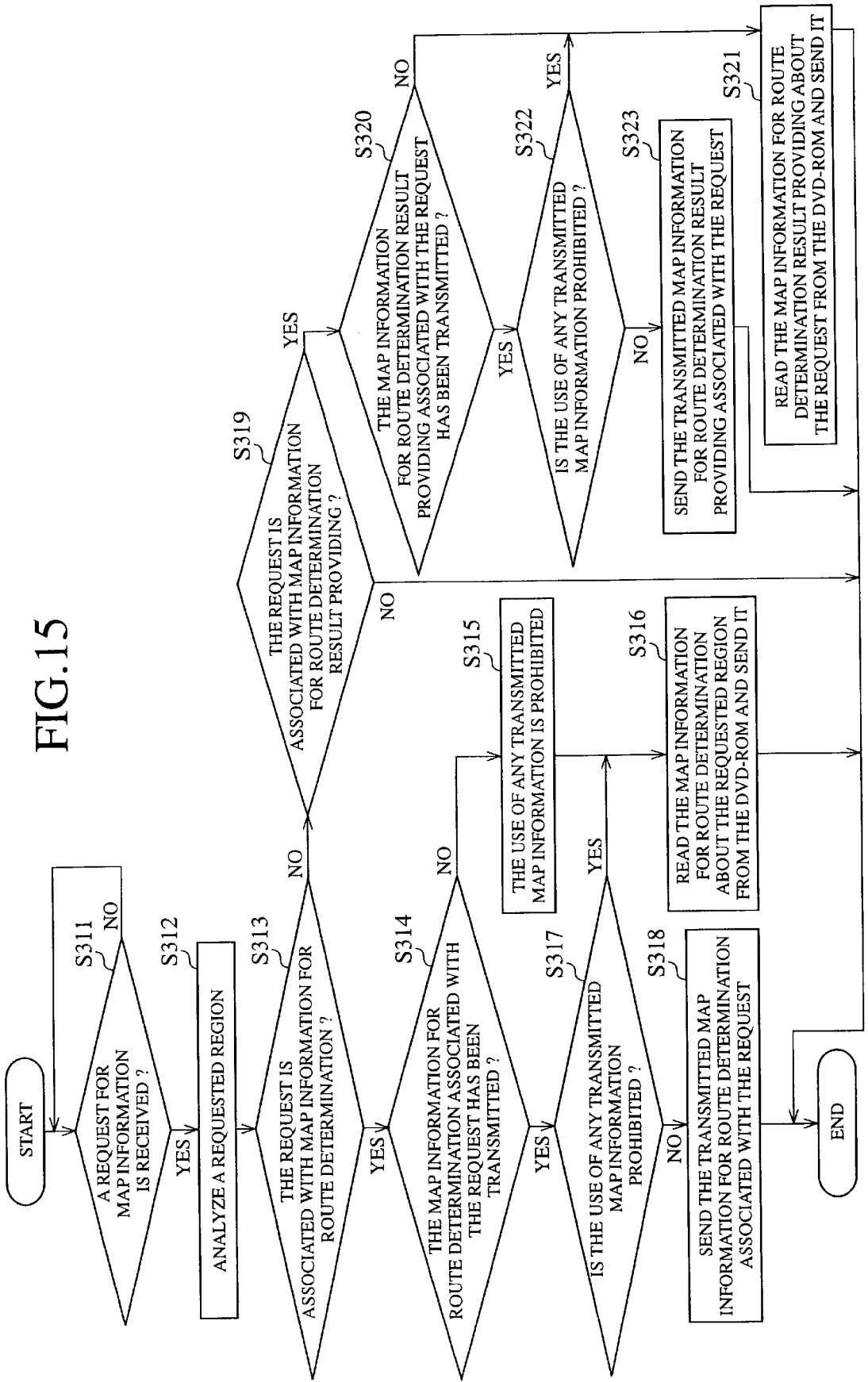

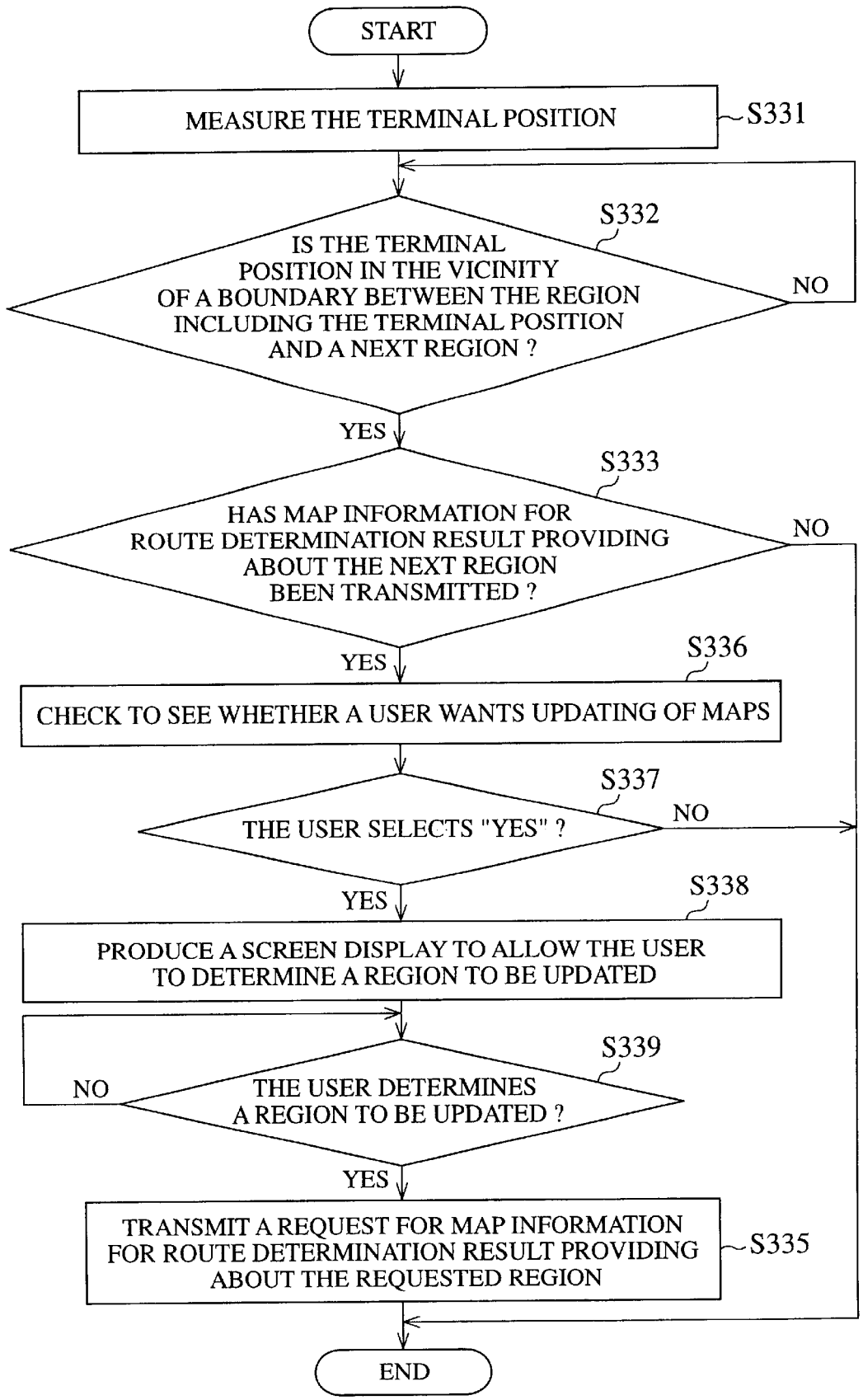

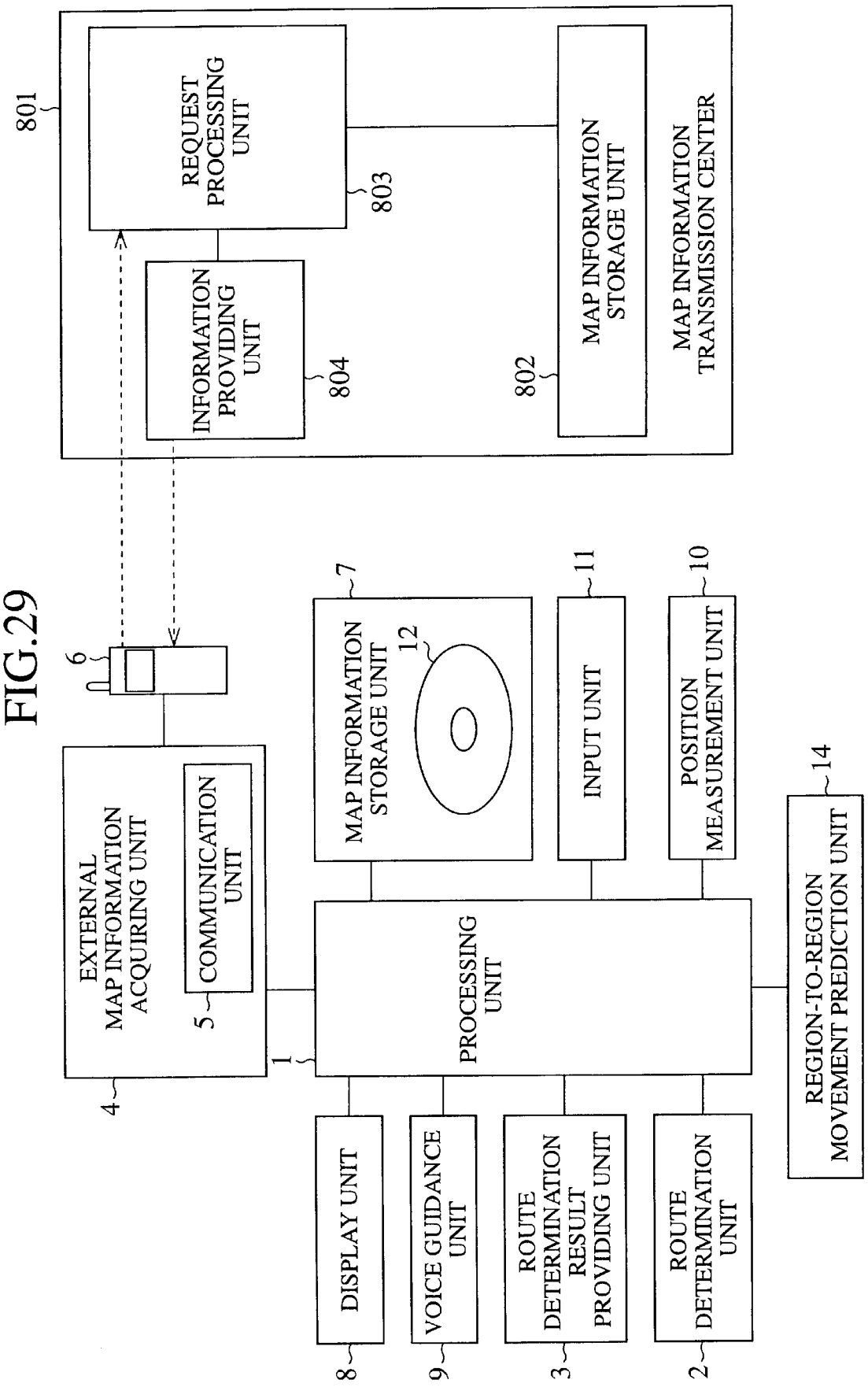

MAP INFORMATION PROCESSING APPARATUS AND MAP INFORMATION TRANSMISSION CENTER

BACKGROUND OF THE INVENTION

1. Field of the Invention

The present invention relates to a map information processing apparatus that acquires map information from outside the map information processing apparatus, carries out route determination, and displays route determination results on a map, and a map information transmission center that provides map information for the map information processing apparatus.

2. Description of Related Art

As shown in Japanese patent application No. 2000-121,371, for example, in order to reduce the amount of map information data to be transmitted, a prior art map information processing apparatus limits transmission of map information to the one about a predetermined region. The prior art map information processing apparatus limits transmission of map information to information about a predetermined region by referring to a past use history and automatically acquires updated map data associated with the region whose map information needs to be kept up to date. Such a limited region can be defined by a plurality of unit regions, which are called meshes defined in two dimensions, as shown in FIG. 46. For example, the region consists of a plurality of meshes enclosed by a heavy line of FIG. 46. The region can be determined according to one or more vehicle positions (plot points) acquired based on the use history. As an alternative, each mesh is ranked based on the number of plot points included therein, and meshes ranked in the top N (N is a predetermined number) are selected as the region. The determination of such a limited region can be carried out by either the vehicle equipped with the map information processing apparatus or a map providing center (map information transmission center) that provides map information. The map providing center delivers the map information data about the limited region to the map information processing apparatus of the vehicle, and the map information processing apparatus updates map information stored therein based on the map information data transmitted thereto from the map providing center, carries out route determination and so on based on the updated map information, and displays route determination results on a map transmitted thereto. The determination of such a limited region can be carried out by either the vehicle equipped with the map information processing apparatus or a map providing center (map information transmission center) that provides map information. The map providing center delivers the map information data about the limited region to the map information processing apparatus of the vehicle, and the map information processing apparatus updates map information stored therein based on the map information data transmitted thereto from the map providing center, carries out route determination and so on based on the updated map information, and displays route determination results on a map transmitted thereto.

In a system including a prior art map information processing apparatus constructed as mentioned above, map information for route determination and map information for route determination result providing are determined in a similar way based on the limitation of a region whose map information is to be transmitted to the map information processing apparatus. As a result, when the region whose map information is to be transmitted to the map information processing apparatus is reduced to a small region in order to reduce the amount of data transmitted, there is a possibility that when performing route determination the frequency of requiring the map information about regions whose map information has not been transmitted to the map information processing apparatus is increased and therefore the route determination cannot be carried out. Although the limitation of a region whose map information is to be transmitted to the map information processing apparatus can be relaxed to solve this problem, the reduction in the amount of data to be transmitted cannot be accomplished by using this method.

SUMMARY OF THE INVENTION

The present invention is proposed to solve the above-mentioned problems, and it is therefore an object of the present invention to provide a map information processing apparatus that can carry out route determination at all times.

It is another object of the present invention to provide a map information transmission center that enables a map information processing apparatus to carry out route determination at all times without increasing the amount of data transmitted to the map information processing apparatus.

In accordance with an aspect of the present invention, there is provided a map information processing apparatus including a route determination unit for determining a route between two arbitrary points by using map information for route determination having one or more levels of hierarchy, a route determination result providing unit for providing route determination results obtained by the route determination unit by using map information for route determination result providing, and an external map information acquiring unit for, when acquiring map information about a predetermined region from outside the map information processing apparatus, acquiring map information for route determination result providing having information about a region of an arbitrary size including the predetermined region, and map information for route determination about at least one unit region including the predetermined region, which is included in map information for route determination at a top of the hierarchy, and map information for route determination about all unit regions that exist at lower levels of the hierarchy than the unit region including the predetermined region. As a result, the map information processing apparatus can carry out route determination at all times without any increase in the amount of transmission data.

In accordance with another aspect of the present invention, there is provided a map information processing apparatus including a route determination unit for determining a route between two arbitrary points by using map information for route determination having one or more levels of hierarchy, a route determination result providing unit for providing route determination results obtained by the route determination unit by using map information for route determination result providing, a map information storage unit for storing the map information for route determination and the map information for route determination result providing, a map information correction unit for making a correction to map information including information about a predetermined region, which is included in the map information held by the map information storage unit, and an external map information acquiring unit for, when acquiring correction map information used for making a correction to the map information including the information about the predetermined region from outside the map information processing apparatus, acquiring map information for route determination result providing having information about a region of an arbitrary size including the predetermined region, and map information for route determination about at least one unit region including the predetermined region, which is included in map information for route determination in a top of the hierarchy, and map information for route determination about all unit regions that exist at lower levels of the hierarchy than the unit region including the predetermined region. As a result, the map information processing apparatus can reduce the amount of data acquired from outside the map information processing apparatus.

In accordance with a further aspect of the present invention, there is provided a map information transmission center including a map information storage unit for storing map information for route determination having one or more levels of hierarchy and map information for route determination result providing, and a map request processing unit for when receiving a request for map information about a predetermined region from outside the map information transmission center, reading map information for route determination result providing having information about a region of an arbitrary size including the predetermined region, and map information for route determination about at least one unit region including the predetermined region, which is included in map information for route determination at a top of the hierarchy, and map information for route determination about all unit regions that exist at lower levels of the hierarchy than the unit region from the map information storage unit, and for delivering those read pieces of map information to an information providing unit for providing map information for outside the map information transmission center. As a result, the map information transmission center enables external equipment to carry out route determination at all times without any increase in the amount of data required for route determination and route determination result providing.

In accordance with another aspect of the present invention, there is provided a map information transmission center including a map information storage unit for storing correction map information used for making a correction to one or more versions of map information each including map information for route determination having one or more levels of hierarchy and map information for route determination result providing, a map request processing unit for when receiving a request for map information about a predetermined region from outside the map information transmission center, reading both correction map information used for making a correction to map information for route determination result providing having information about a region of an arbitrary size including the predetermined region and correction map information used for making a correction to both map information for route determination about at least one unit region including the predetermined region, which is included in map information for route determination at a top of the hierarchy, and map information for route determination about all unit regions that exist at lower levels of the hierarchy than the unit region from the map information storage unit, and for delivering those read pieces of correction map information to an information providing unit for providing map information for outside the map information transmission center. As a result, the map information transmission center can reduce the amount of data provided to outside the map information transmission center.

Further objects and advantages of the present invention will be apparent from the following description of the preferred embodiments of the invention as illustrated in the accompanying drawings.

BRIEF DESCRIPTION OF THE DRAWINGS

FIG. 15 is a diagram showing a flow chart of map information acquiring processing performed by the map information processing apparatus according to embodiment 2 of the present invention when using map information;

FIG. 27 is a diagram showing a flow chart of another example of the map information request processing performed by the map information processing apparatus according to embodiment 5 of the present invention;

FIG. 29 is a block diagram showing the structures of a map information processing apparatus and a map information transmission center according to embodiment 6 of the present invention;

DETAILED DESCRIPTION OF THE PREFERRED EMBODIMENTS

Embodiment 1

The invention will now be described with reference to the accompanying drawings.

Figure 1:
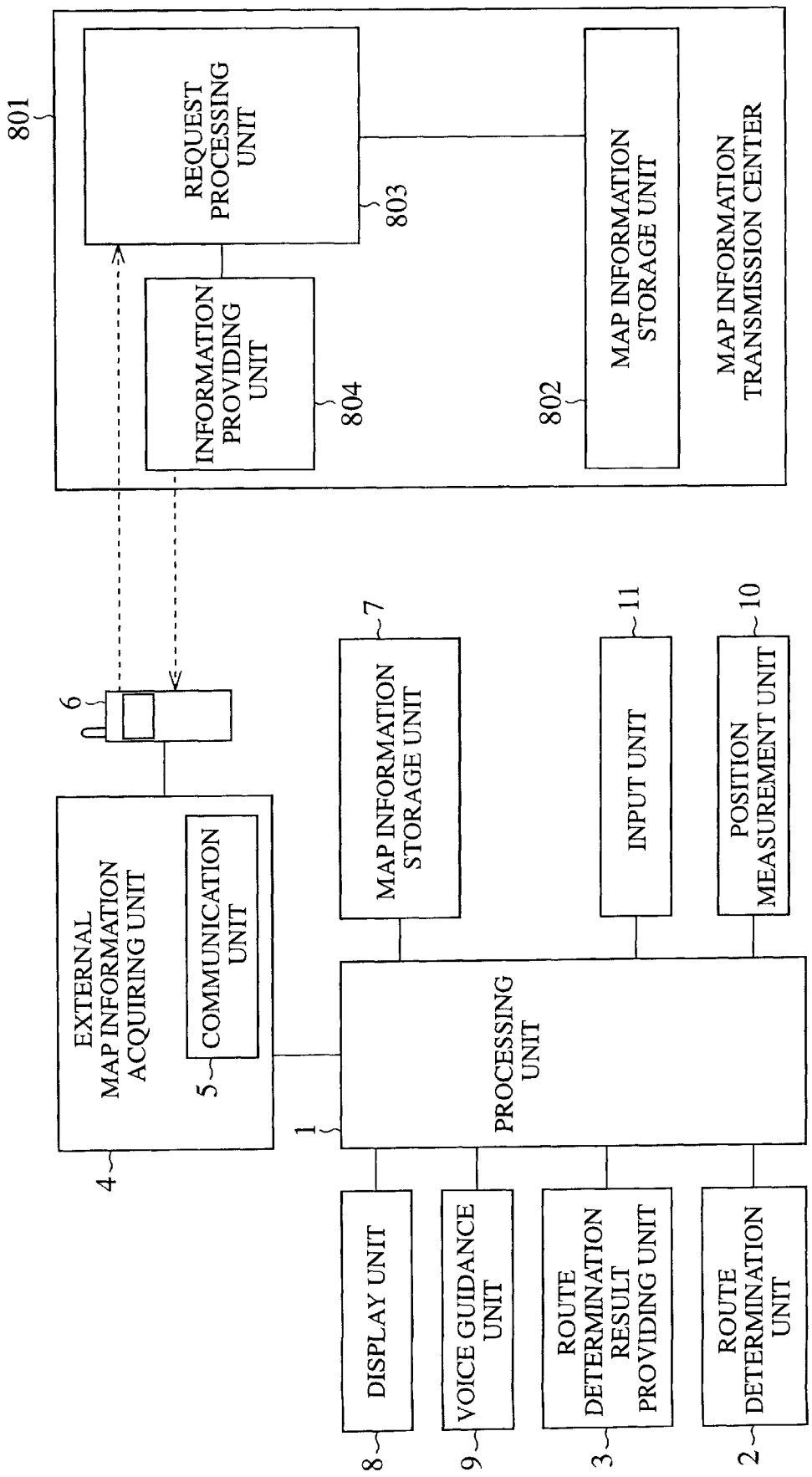
FIG. 1 is a block diagram showing the structures of a map information processing apparatus and a map information transmission center according to embodiment 1 of the present invention.

FIG. 1 is a block diagram showing the structures of a map information processing apparatus and a map information transmission center according to embodiment 1 of the present invention. In the figure, reference numeral 1 denotes a processing unit, reference numeral 2 denotes a route determination unit for determining a route between two arbitrary points by using map information for route determination having one or more levels of hierarchy, reference numeral 3 denotes a route determination result providing unit for providing route determination results obtained by the route determination unit 2 by using map information for route determination result providing, reference numeral 4 denotes an external map information acquiring unit for acquiring map information from outside the map information processing apparatus, reference numeral 5 denotes a communication unit that carries out communications with equipment disposed outside the map information processing apparatus, reference numeral 6 denotes a mobile phone disposed as a communication means, reference numeral 7 denotes a map information storage unit for storing the map information acquired from outside the map information processing apparatus, and for holding the map information for route determination having one or more levels of hierarchy and the map information for route determination result providing about a region of an arbitrary size, reference numeral 8 denotes a display unit for providing maps and input menus in a visual form for users, reference numeral 9 denotes a voice guidance unit for providing a guidance for users by voice, reference numeral 10 denotes a position measurement unit for measuring the current position of a terminal itself equipped with the map information processing apparatus, and reference numeral 11 denotes an input unit for allowing users to input data. The processing unit 1 performs processing associated with each of those components. Reference numeral 801 denotes the map information transmission center, and reference numeral 802 denotes a map information storage unit disposed in the map information transmission center 801, for holding the map information for route determination having one or more levels of hierarchy and the map information for route determination result providing about a region of an arbitrary size. Reference numeral 803 denotes a request processing unit for processing a request for map information from outside the map information transmission center, and for determining map information to be transmitted from a requested region, and reference numeral 804 denotes an information providing unit for providing information for outside the map information transmission center.

When providing route determination results, the route determination result providing unit 3 performs the display of a route and route guidance. The display of the route is a process of superimposing the route determination results on a map, and providing them in a visual form by using the display unit 8. The route guidance is a process of providing a distance to a point where a vehicle equipped with the map information processing apparatus should change the direction of travel next, the name and address of the point, local facilities used for identifying the point, and the direction in which the vehicle is to be headed when reaching the point in a visual form by using the display unit 8. The route guidance can also include a process of providing the distance to the point where the vehicle should change the direction of travel next, the name and address of the point, local facilities used for identifying the point, and the direction in which the vehicle is to be headed when reaching the point by using the voice guidance unit 9.

The position measurement unit 10 analyzes signals from GPS satellites, and calculates the current position of the terminal itself. In addition, through further use of analysis of a signal from a gyro sensor, the position measurement unit 10 can perform the position measurement with a higher degree of accuracy.

Through the input unit 11, users can input data by using a remote control unit. As an alternative, users can input data ith a touch panel, operating buttons, or voice recognition.

The processing unit 1 controls operations of the map information processing apparatus based on an operation of each of the units 2 to 4 and 7 to 11.

Figure 2:
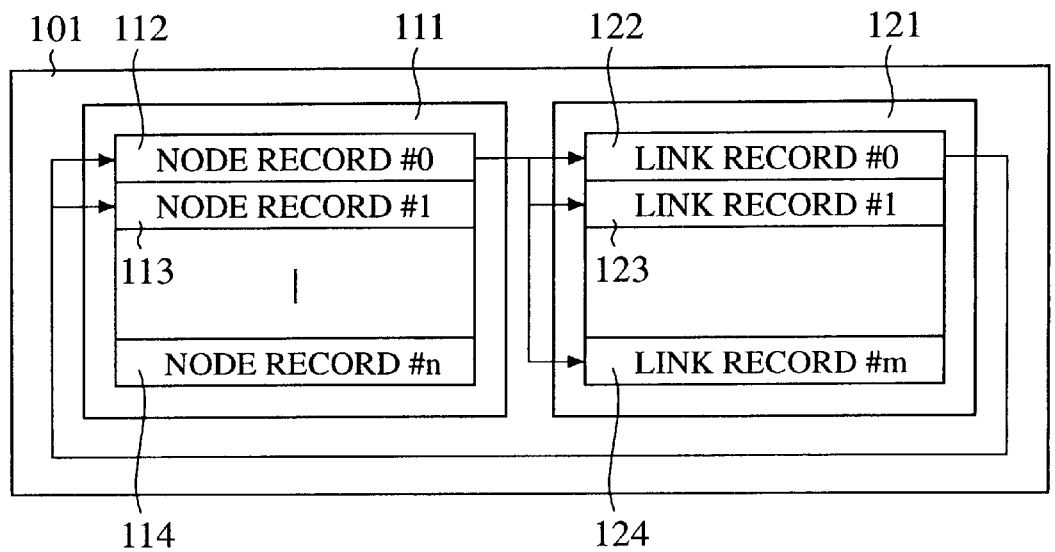
FIGS. 2A and 2B are diagrams showing the structures of map information for route determination and map information for route determination result providing according to embodiment 1 of the present invention, respectively.
Figure 2:
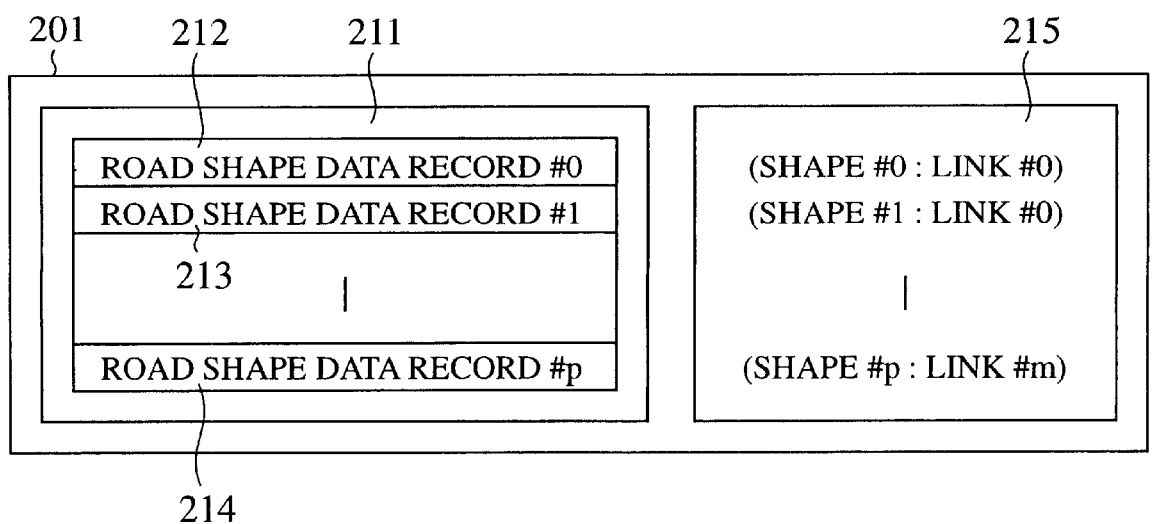

FIGS. 2A and 2B show the structure of the map information for route determination and the structure of the map information for route determination result providing, respectively. In the figure, reference numeral 101 denotes the map information for route determination, and reference numeral 201 denotes the map information for route determination result providing. The map information for route determination 101 consists of at least a node table 111 and a link table 121. The node table 111 is a group of node records 112 to 114, and the link table 121 is a group of link records 122 to 124. Nodes and links represent intersections and roads between intersections in the real world, respectively.

In the map information for route determination 101, each node record is associated with all link records representing roads that form the intersection represented by each node record itself, and each link record is associated with node records representing two intersections that exist at both finishes of the road between the two intersections, the road being represented by each link record itself.

The map information for route determination result providing 201 consists of at least a road shape data list 211. The road shape data list 211 is a group of road shape data records 212 to 214. Furthermore, the map information for route determination result providing 201 contains a shape data to link correspondence table 215 used for identifying link records to which individual road shape data records correspond respectively. As an alternative, this shape data to link correspondence table 215 can be included in the map information for route determination 101.

The route determination unit 2 determines a route between two arbitrary points through graph searching based on connections between node records and link records by using the map information for route determination 101 which is included in the map information stored in the map information storage unit 7.

The route determination result providing unit 3 determines a map based on the road shape data list 215 by using the map information for route determination result providing 201 which is included in the map information stored in the map information storage unit 7, and superimposes the route determination results obtained by the route determination unit 2 on the map and provides them in a visual form for users.

Figure 3:
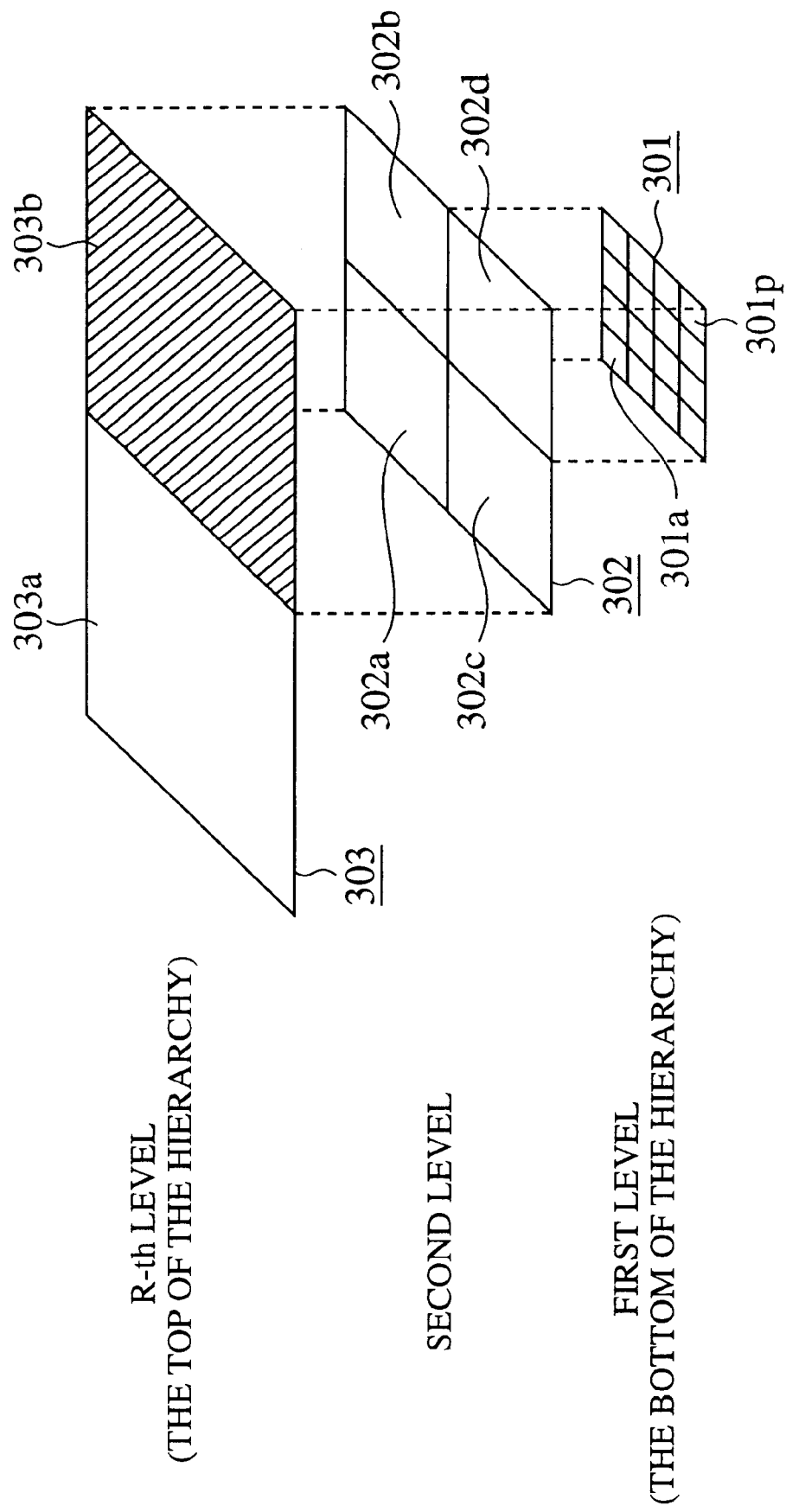
FIG. 3 is a diagram showing a hierarchical structure of the map information for route determination according to embodiment 1 of the present invention.

FIG. 3 shows the hierarchical structure of the map information for route determination. In the figure, reference numeral 301 denotes map information for route determination at the bottom of the hierarchy, reference numeral 302 denotes map information for route determination at the second level of the hierarchy, reference numeral 303 denotes map information for route determination at the top of the hierarchy, reference numerals 303a and 303b denote divided unit regions included in the map information for route determination at the top of the hierarchy, reference numerals 302a to 302d denote divided unit regions included in the map information for route determination at the second level of the hierarchy, and reference numerals 301a to 301p denote divided unit regions included in the map information for route determination at the bottom of the hierarchy. The map information for route determination 101 thus has one or more levels (three levels in the case of FIG. 3) of hierarchy. The information for route determination 303 at the top of the hierarchy consists of one or more unit regions.

Because in the map information for route determination 101 there is a relationship between data at different levels of the hierarchy, if consistency is not provided between the version of the map information about at least one unit region, which is included in the map information for route determination 303 at the top of the hierarchy, and the version of the map information about all unit regions located in lower levels (for example, between the version of the map information about the region 303b and the version of the map information about the regions 302a to 302d and 301a to 301p), the route determination cannot be carried out correctly. On the other hand, although the map information for route determination result providing 201 is hierarchized, because information to be used is limited to the map information about a region where the terminal is traveling and the map information about regions in the vicinity of the terminal, the consistency between versions need not be maintained. A minimum region required for the route determination without contradiction is one unit region included in the map information for route determination 301 at the top of the hierarchy because the map information for route determination 101 and the map information for route determination result providing 201 have such features. Furthermore, a minimum region required for providing the route determination results is one unit region (not shown in the figure) included in the map information for route determination, result providing at the bottom of the hierarchy.

In accordance with this embodiment, different limitations of a region are imposed on map information for route determination result providing and map information for route determination, respectively, which are included in map information to be transmitted from the map information transmission center 801 to the map information processing apparatus. In other words, the map information for route determination result providing to be transmitted is map information about a region of an arbitrary limited size, and is map information about one or more unit regions corresponding to a predetermined region selected by users, which is included in the map information for route determination result providing at the bottom of the hierarchy. The reason why the map information for route determination result providing to be transmitted is map information about such a limited region is that the map information for route determination result providing has a large amount of data, a large reduction in the amount of transmission data can be expected by reducing the size of the limited region, and map information about a region in the vicinity of the point where the terminal is traveling now is used as the map information for route determination result providing to be transmitted. As a result, the amount of transmission data can be reduced to a realistic amount. As the map information for route determination, the map information about one unit region including the selected region, which is included in the map information for route determination at the top of the hierarchy, and the map information about all unit regions that exist at lower levels of the hierarchy are transmitted. The reason why the transmission of map information for route determination to be transmitted is limited to map information about such a limited region is that because the data amount is significantly small as compared with the amount of the map information for route determination result providing, the above-mentioned limitations result in a not large influence on the amount of data to be transmitted. As a result, the map information processing apparatus can carry out appropriate route determination at any time.

During the transmission of the map information for route determination, the map information about a plurality of unit regions, which is included in the map information for route determination at the top of the hierarchy, and the map information about all unit regions that exist at lower levels of the hierarchy can be transmitted at once. As previously mentioned, the map information for route determination has a very small amount of data as compared with the amount of the map information for route determination result providing to be transmitted. Therefore, even if the map information for route determination about a wider region is transmitted at once, the amount of transmission data is not increased significantly and therefore can be reduced to a realistic amount of transmission data.

Figure 4:
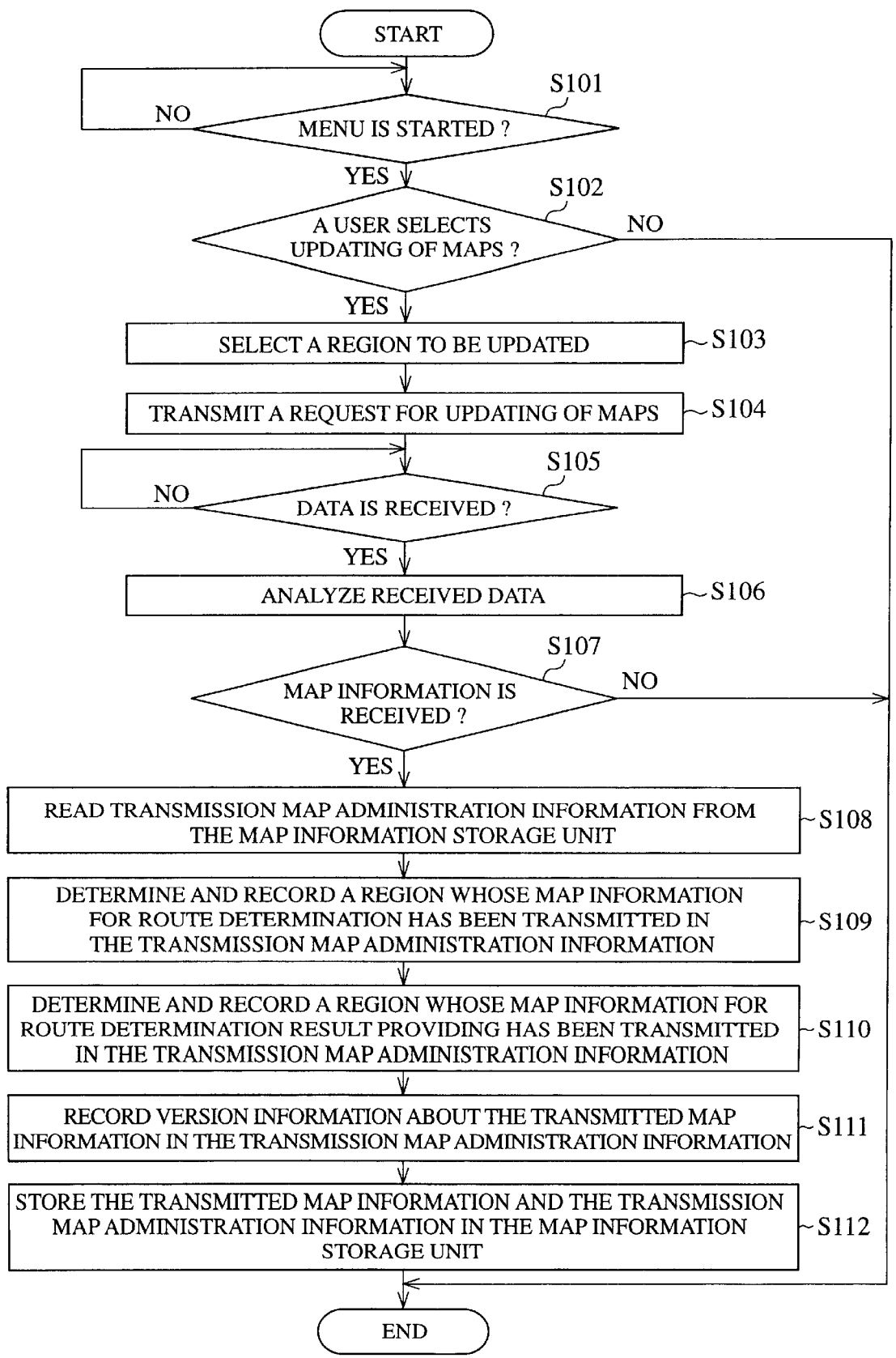
FIG. 4 is a diagram showing a flow chart of map information acquiring processing performed by the map information processing apparatus according to embodiment 1 of the present invention.
Figure 5:
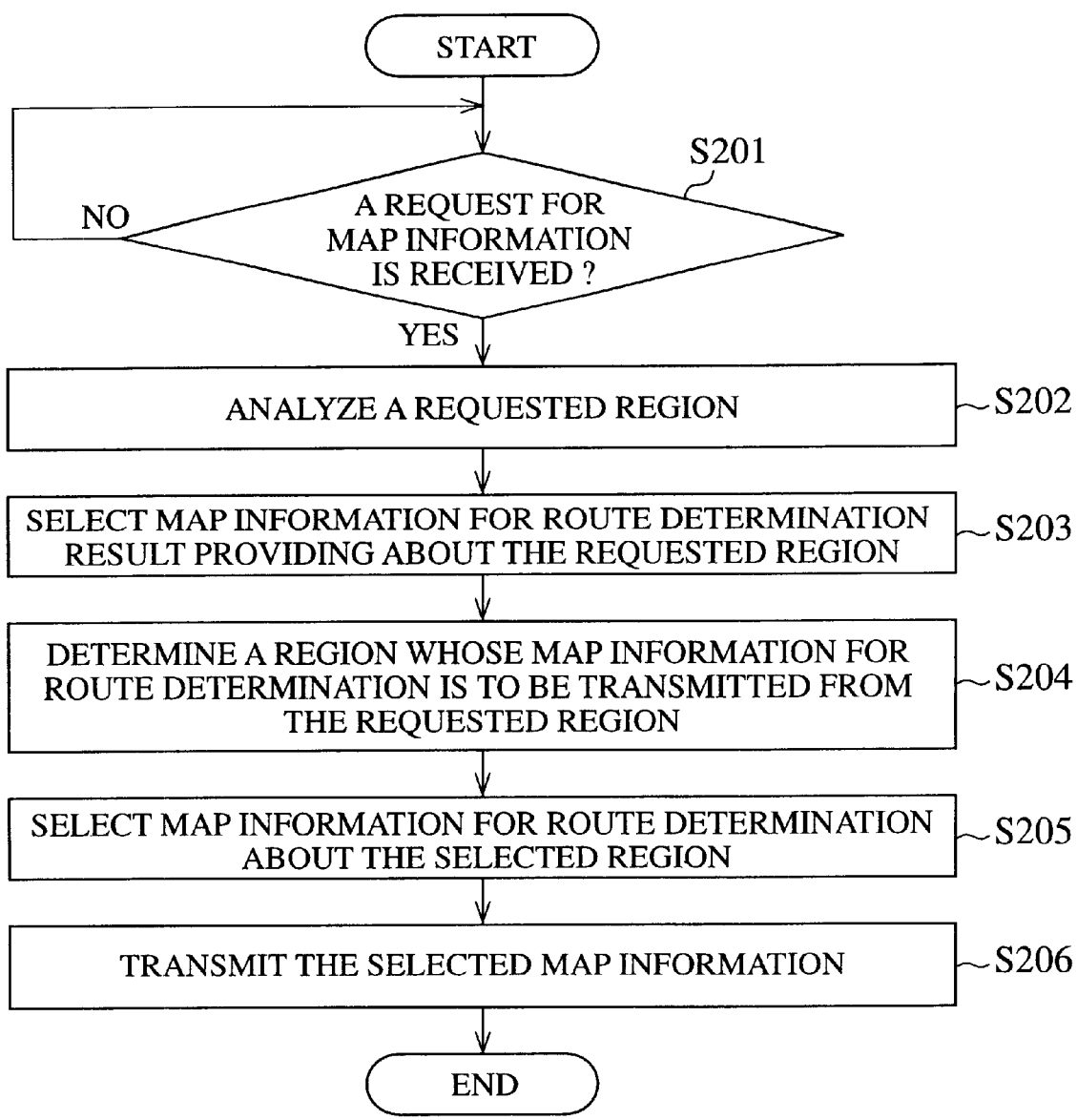
FIG. 5 is a diagram showing a flowchart of map information request processing performed by the map information transmission center according to embodiment 1 of the present invention.

FIG. 4 shows a flow chart of map information acquiring (updating) processing performed by the map information processing apparatus according to this embodiment 1, and FIG. 5 shows a flow chart of map information request processing performed by the map information transmission center according to this embodiment 1.

Figure 6:
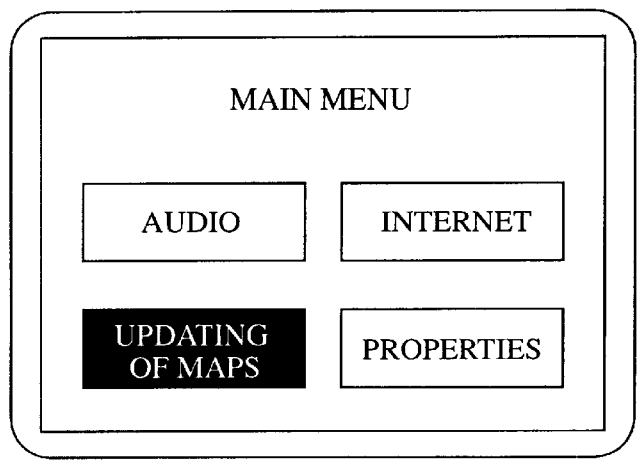
FIG. 6 is a diagram for explaining an operation of the map information processing apparatus according to embodiment 1 of the present invention.
Figure 7:
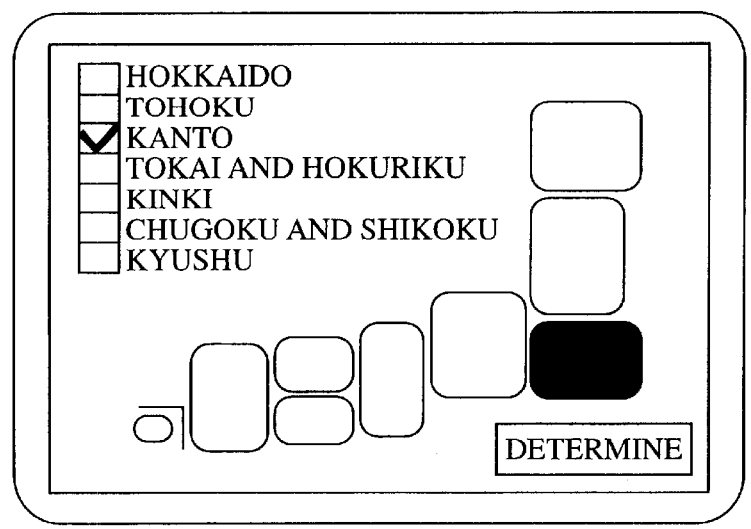
FIG. 7 is a diagram for explaining an operation of the map information processing apparatus according to embodiment 1 of the present invention.
Figure 8:
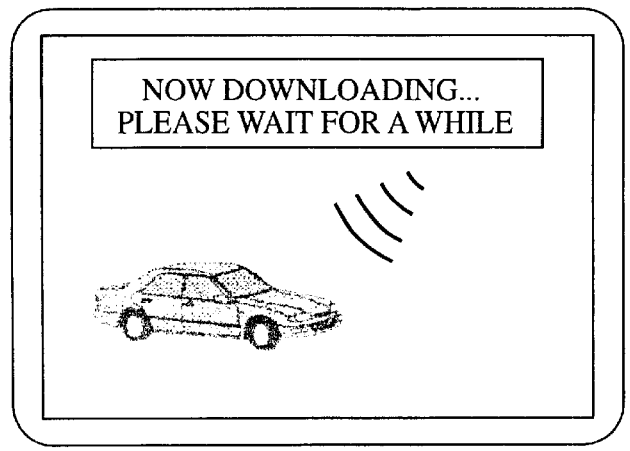
FIG. 8 is a diagram for explaining an operation of the map information processing apparatus according to embodiment 1 of the present invention.

As shown in FIG. 4, when a menu startup instruction is issued to the input unit 11 by a user's operation (in step S101), a menu screen as shown in FIG. 6 is displayed on the display unit 8. In this situation, when the user selects updating of maps through the input unit 11 (in step S102), a region selection screen as shown in FIG. 7 is displayed on the display unit 8. The user can select a predetermined region that is to be updated from the display screen (in step S103). The region which the user can select can be one of a plurality of divided areas, such as a plurality of administrative divisions, or a plurality of cities, towns, and villages other than a plurality of regional divisions as shown in FIG. 7. As an alternative, the region which the user can select can be one of divided areas, such as North Japan, East Japan, and West Japan, which are larger than those shown in FIG. 7. Instead, the region which the user can select can be an arbitrary region specified by the user, or an arbitrary region which is automatically defined by the system. When the region to be updated is thus determined, the map information processing apparatus transmits a request for map information including information about the selected region to be updated to the map information transmission center 801 (in step S104). After transmitting the request, the map information processing apparatus enters a data reception waiting state (in step S105), and displays a screen for notifying the user that the map information processing apparatus is placed in the map information reception waiting state, as shown in FIG. 8, through the display unit 8.

Figure 9:
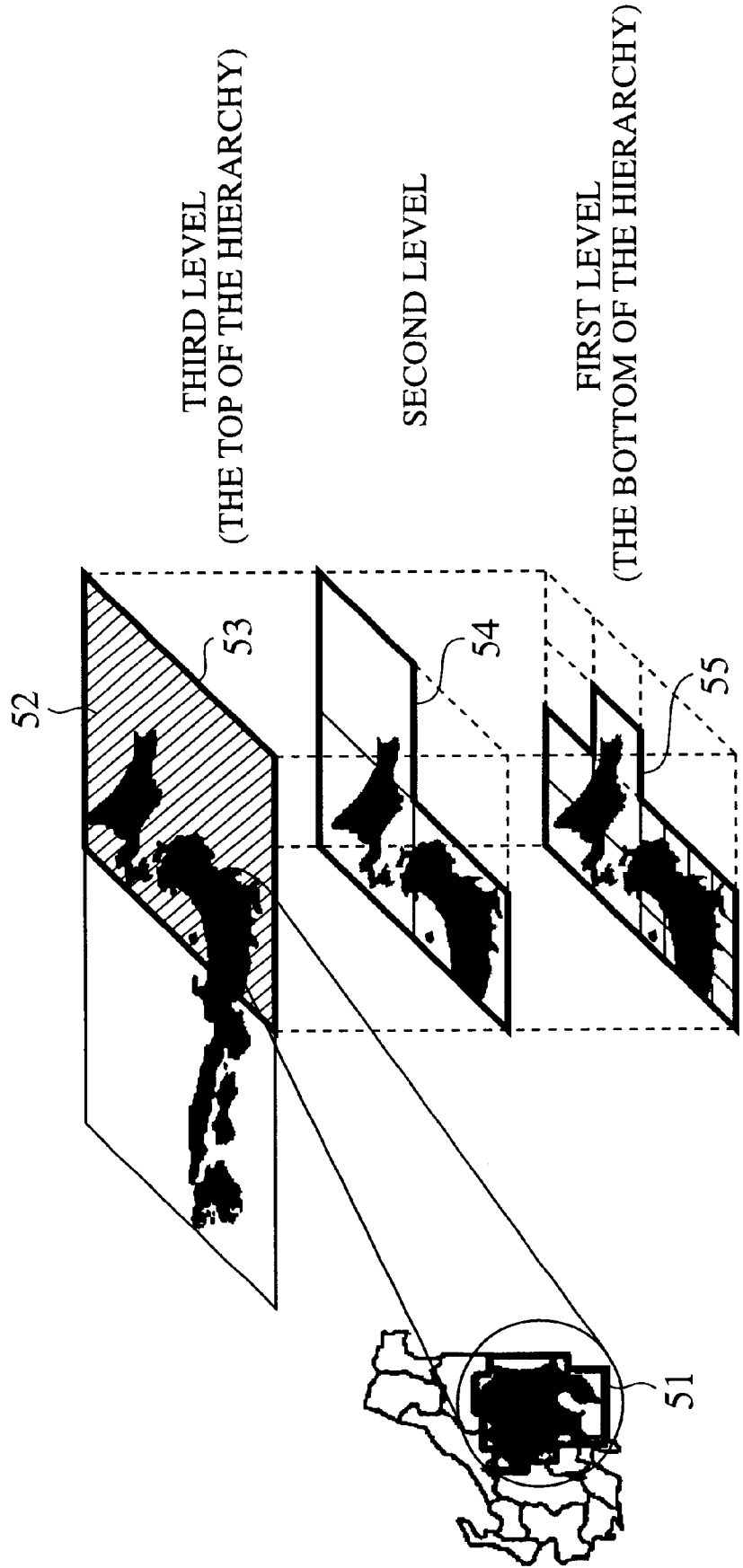
FIG. 9 is a diagram for explaining an operation of the map information processing apparatus according to embodiment 1 of the present invention.

When receiving the request for map information (in step S201), the map information transmission center 801 analyzes the request and determines the region for which updating is requested (referred to as the requested region from here on) (in step S202), as shown in FIG. 5. When the requested region is the Kanto area, i.e., a region 51 enclosed by a heavy solid line, as shown in FIG. 9, the map information transmission center selects map information for route determination result providing corresponding to this region 51 (in step S203). The map information transmission center then determines a region whose map information for route determination is to be transmitted from the requested region (in step S204). When the requested region is the region 51 enclosed by a heavy solid line in FIG. 9, the map information transmission center determines a unit region including the region 51 from among the plurality of unit regions which constitute the map information for route determination at the top of the hierarchy. In this example, a hashed region 52 of FIG. 9 is the determined unit region. When determining the limited unit region whose map information is to be transmitted for the map information for route determination to be transmitted, the map information transmission center selects map information for route determination at all other levels associated with this limited unit region at the top of the hierarchy (in step S205). In the example of FIG. 9, the three pieces of map information about regions 53 to 55 each enclosed by a heavy solid line are selected. Finally, the map information transmission center 801 transmits the selected map information for route determination and the selected map information for route determination result providing to the map information processing apparatus, and finishes the servicing of the request for map information (in step S206). When transmitting the map information selected in S206, the map information transmission center 801 also transmits administration information representing the region associated with the selected map information for route determination and administration information representing the region associated with the selected map information for route determination result providing to the map information processing apparatus if they are available.

Figure 10:
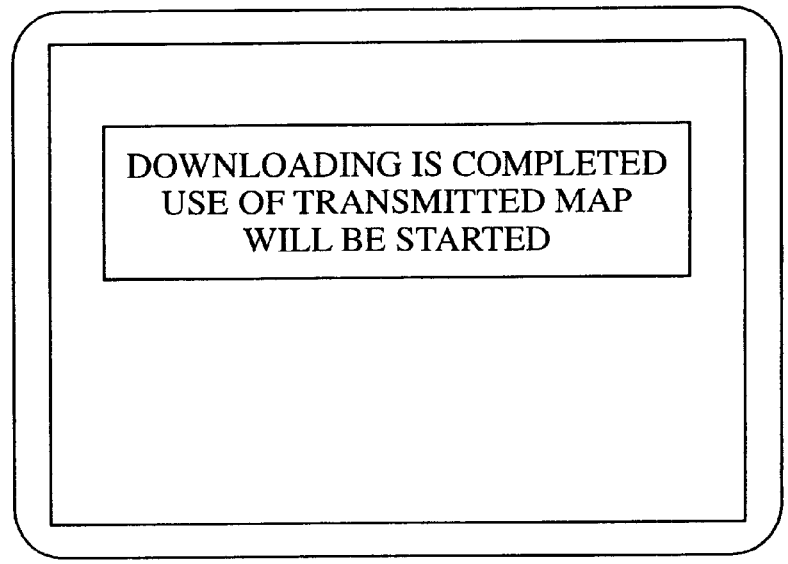
FIG. 10 is a diagram for explaining an operation of the map information processing apparatus according to embodiment 1 of the present invention.
Figure 11:
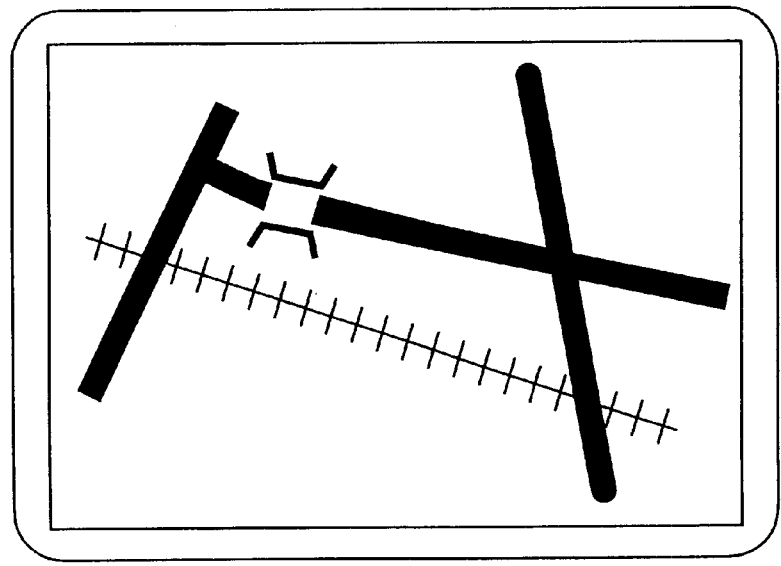
FIG. 11 is a diagram for explaining an operation of the map information processing apparatus according to embodiment 1 of the present invention.

As shown in FIG. 4, when the map information processing apparatus receives data from the map information transmission center from 801 while it is placed in the data reception waiting state (in step S105), the map information processing apparatus notifies the user that it completes the reception of map information through the display unit 8, as shown in FIG. 10. The map information processing apparatus then determines whether it has received the map information about the predetermined region (in step S107) by analyzing the contents of the received data (in step S106). When the map information processing apparatus has not received the map information about the predetermined region, it finishes the updating of map information. When the map information processing apparatus has received the map information about the predetermined region, it reads transmission map administration information used for managing the region associated with the map information that has already been transmitted thereto from the map information storage unit 7 (in step S108). Then, the map information processing apparatus determines the region associated with the received map information for route determination and writes the region information in the corresponding transmission map administration information (in step S109). Similarly, the map information processing apparatus determines the region associated with the map information for route determination result providing, and writes the region information in the corresponding transmission map administration information (in step S110). In addition, the map information processing apparatus reads version information which each map information transmitted thereto accompanies and writes it in the corresponding transmission map administration information (in step S111). When determining the region associated with the map information for route determination and the region associated with the map information for route determination result providing received in steps S109 and S110, the map information processing apparatus determines these regions by using the administration information representing each of the regions associated with each map information if each map information transmitted from the map information transmission center 801 includes the corresponding administration information. Unless the corresponding administration information is included in each map information transmitted from the map information transmission center 801, the map information processing apparatus analyzes each map information so as to determine the region associated with each map information. The map information processing apparatus then stores each received map information and the corresponding transmission map administration information in which the writing of the region information has be ended in the map information storage unit 7 and finishes the process of updating map information. (in step S112). The map information storage unit 7 can be an internal volatile storage medium. Preferably, the map information storage unit 7 can be a hard disk or a nonvolatile memory card in which each received map information and the corresponding transmission map administration information are stored. When the data storing is completed, the position measurement unit 10, the route determination unit 2, the route determination result providing unit 3, and the display unit 8 can use the transmitted map information. Navigation using the transmitted map information can be implemented as shown in FIG. 11.

Figure 12:
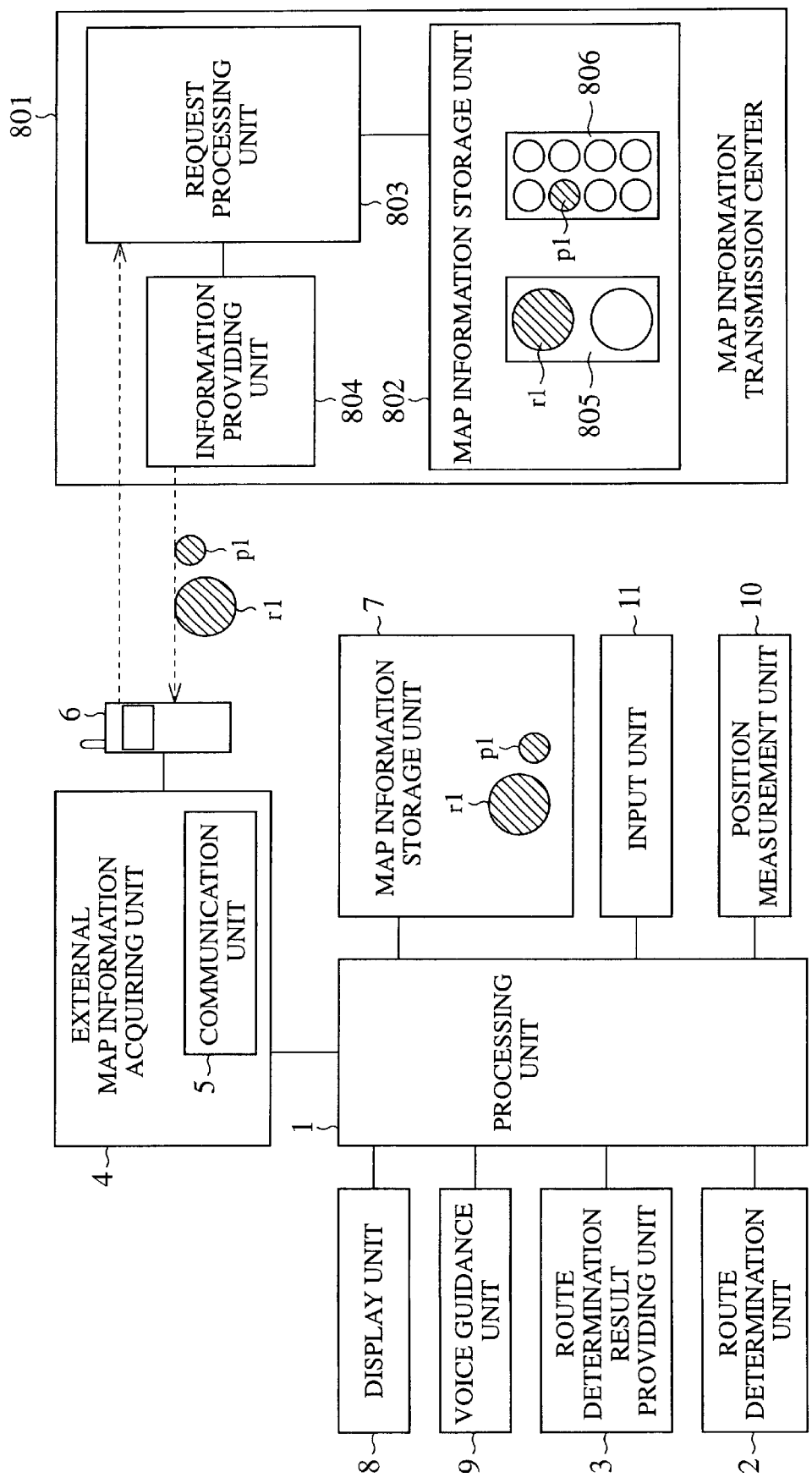
FIG. 12 is a diagram for explaining operations of the map information processing apparatus and the map information transmission center according to embodiment 1 of the present invention.

FIG. 12 shows a data flow in the processing described above. In FIG. 12, the same reference numerals as shown in FIG. 1 denote the same components or like components. Reference numeral 805 denotes map information for route determination held by the map information storage unit 802, reference numeral 806 denotes map information for route determination result providing held by the map information storage unit 802, reference character r1 denotes map information for route determination about one unit region at the top of the hierarchy including the selected region and the map information about all unit regions that exist at lower levels of the hierarchy, and reference character p1 denotes map information for route determination result providing about a region of an arbitrary size corresponding to the selected region.

The map information transmission center 801 analyzes the requested region by using the request processing unit 803 according to the request for map information from the map information processing apparatus. The map information transmission center 801 selects the map information for route determination r1 and the map information for route determination result providing p1 as map information corresponding to the request. These pieces of map information r1 and p1 are sent to the map information processing apparatus by the information providing unit 804.

In the map information processing apparatus, the external map information acquiring unit 4 acquires those pieces of map information r1 and p1 through the mobile phone 6, and the processing unit 1 processes these pieces of acquired map information and stores them in the map information storage unit 7.

In accordance with this embodiment, the map information processing apparatus acquires map information by using the mobile phone 6. However, the communication method which the map information processing apparatus uses is not limited to the mobile phone, and communications by using PHS or DSRC can provide the same advantage.

Figure 13:
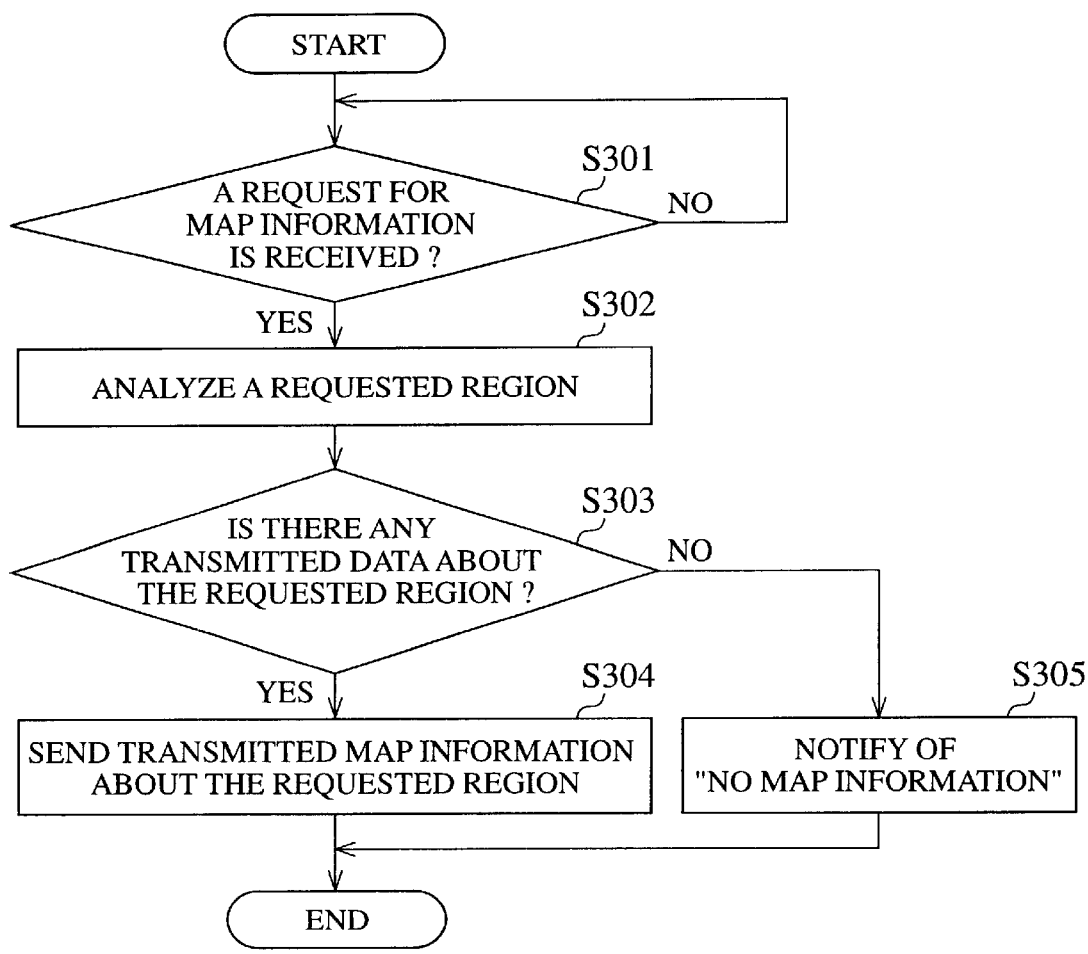
FIG. 13 is a diagram showing a flow chart of the map information acquiring processing performed by the map information processing apparatus according to embodiment 1 of the present invention when using map information.

FIG. 13 shows a flow chart of map information acquiring processing performed by the processing unit 1 when the position measurement unit 10, the route determination unit 2, the route determination result providing unit 3, and the display unit 8 use the map information stored in the map information storage unit 7. When either one of the position measurement unit 10, the route determination unit 2, the route determination result providing unit 3 and the display unit 8 makes a request for use of map information of the processing unit 1 (in step S301), the processing unit 1 determines a region associated with the requested map information (in step S302). The processing unit 1 can identify the region associated with the map information for route determination transmitted to the map information processing apparatus and the region associated with the map information for route determination result providing transmitted to the map information processing apparatus. The request issued by either one of the position measurement unit 10, the route determination unit 2, the route determination result providing unit 3 and the display unit 8 contains information used for determining whether the requested map information is either map information for route determination or map information for route determination result providing. Therefore the map information processing apparatus can determine whether the map information that corresponds to the requested region determined in step S302 exists therein (in step S303). The processing unit 1 then delivers the corresponding map information to the unit which has made the request when the map information corresponding to the requested region exists therein (in step S304), and finishes the map information acquiring processing. The processing unit 1 notifies the unit which has made the request of no existence of the map information corresponding to the requested region when the corresponding map information doesn't exist therein (in step S305), and finishes the map information acquiring processing.

As mentioned above, the map information processing apparatus in accordance with this embodiment receives map information for route determination result providing about a limited region and map information for route determination about a limited region that differs from the former limited region associated with the map information for route determination result providing from outside the map information processing apparatus. The limited region of the transmitted map information for route determination is defined in map information at the top of the hierarchy which covers at least a region selected by users. The map information for route determination about all levels of the hierarchy for that limited region is transmitted to the map information processing apparatus at once. Furthermore, the limited region of the transmitted map information for route determination result providing has an arbitrary size and is the one located at the bottom of the hierarchy including the selected region. By thus limiting the transmission of each of the map information for route determination and the map information for route determination result providing to the map information about a limited region, the map information processing apparatus can carry out route determination at all times without any increase in the amount of transmission data. The map information transmission center enables the map information processing apparatus to carry out route determination at all times without any increase in the amount of data transmitted to the map information processing apparatus.

Embodiment 2

Figure 14:
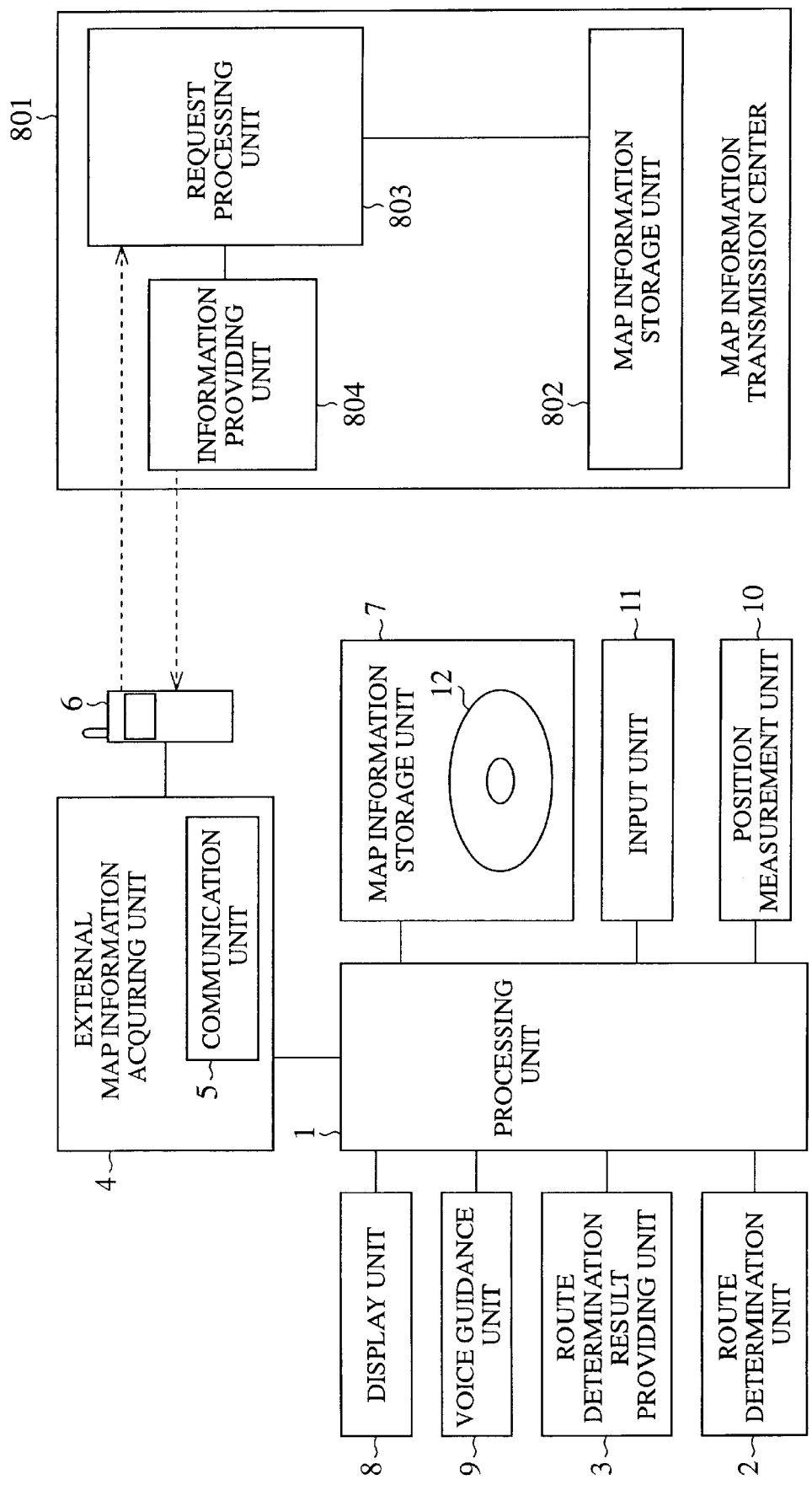
FIG. 14 is a block diagram showing the structures of a map information processing apparatus and a map information transmission center according to embodiment 2 of the present invention.

FIG. 14 is a block diagram showing the structures of a map information processing apparatus and a map information transmission center according to embodiment 2 of the present invention. In FIG. 14, the same reference numerals as shown in FIG. 1 denote the same components as those of the map information processing apparatus and the map information transmission center according to embodiment 1 of the present invention or like components. In accordance with this embodiment 2, a map information storage unit 7 is provided with a DVD-ROM 12 in which at least map information for route determination and map information for route determination result providing are recoded in advance. The map information storage unit 7 can have either a CD-ROM or a hard disk drive instead of the DVD-ROM 12.

When performing route determination and when displaying route determination results, the map information processing apparatus shown in FIG. 14 uses map information transmitted thereto for regions whose map information has been transmitted from outside the map information processing apparatus, and map information recorded in the DVD-ROM for regions whose map information has not been transmitted from outside the map information processing apparatus. As a result, in the map information processing apparatus, map information about any region whose map information has not been transmitted from outside the map information processing apparatus is available. The map information processing apparatus performs other operations in the same way that that of embodiment 1 does.

When using map information about a region, which has been transmitted from outside the map information processing apparatus, and map information about another region, which has not been transmitted from outside the map information processing apparatus, at the same time, a route determination unit 2 stops the use of the transmitted map information and uses corresponding map information stored in the DVD-ROM even for the region whose map information has been transmitted from outside the map information processing apparatus, thereby solving a problem encountered with the route determination caused by the coexistence of different versions of map information.

Figure 16:
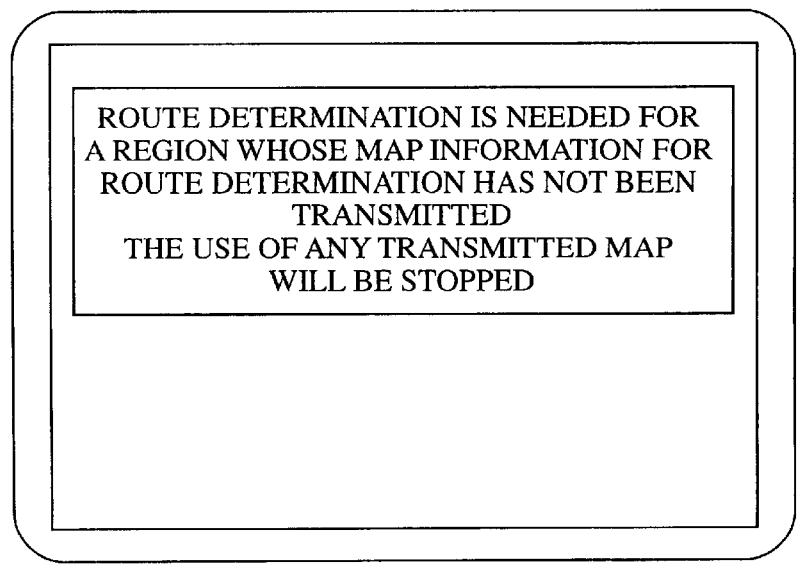
FIG. 16 is a diagram for explaining an operation of the map information processing apparatus according to embodiment 2 of the present invention.

FIG. 15 shows a flow chart of map information acquiring processing performed by a processing unit 1 when a position measurement unit 10, the route determination unit 2, a route determination result providing unit 3, and a display unit 8 use map information stored in the map information storage unit 7. When a request for map information is made (in step S311), the processing unit 1 determines a region associated with the requested map information (in step S312). Then the processing unit 1 determines whether the request is associated with either map information for route determination or map information for route determination result providing (in step S313). When a request for map information for route determination has been made, the processing unit 1 determines whether or not map information for route determination associated with the region determined in step S312 has been transmitted from outside the map information processing apparatus (in step S314). When no information for route determination associated with the region has been transmitted to the map information processing apparatus, the processing unit 1 prohibits the use of any map information transmitted to the map information processing apparatus so that different versions of map information for route determination cannot be used simultaneously (in step S315). The processing unit 1 then acquires the corresponding map information for route determination associated with the requested region from the DVD-ROM and delivers it to a unit which has made the request (in step S316), and finishes the map information acquiring processing. At this time, as shown in FIG. 16, the processing unit 1 allows the display unit 8 to display a sentence that notifies that the use of any transmitted map information is stopped. As an alternative, the processing unit 1 can notify users of the same contents through a voice guidance unit 9. When it is determined that the corresponding map information for route determination about the requested region has been transmitted in step S314, the processing unit 1 determines whether or not the use of any transmitted map information is prohibited (in step S317). When the use of any transmitted map information is prohibited, the processing unit 1 acquires the corresponding map information for route determination about the requested region from the DVD-ROM and delivers it to a unit which has made the request (in step S316), and finishes the map information acquiring processing. In contrast, when the use of any transmitted map information is not prohibited, the processing unit 1 delivers the transmitted map information for route determination about the requested region to a unit which has made the request (in step S318), and finishes the map information acquiring processing. When it is determined that the requested map information is not map information for route determination in step S313, the processing unit 1 determines whether or not the required map information is map information for route determination result providing (in step S319). When the requested map information is not map information for route determination result providing, the processing unit 1 finishes the map information acquiring processing. In contrast, when the required map information is map information for route determination result providing, the processing unit 1 determines whether or not the map information for route determination result providing about the requested region has been transmitted (in step S320). When the map information for route determination result providing about the requested region has not been transmitted, the processing unit 1 acquires corresponding map information for route determination result providing about the requested region from the DVD-ROM delivers it to a unit which has made the request (in step S321), and finishes the map information acquiring processing. When the map information for route determination result providing about the requested region has been transmitted, the processing unit 1 determines whether or not the use of any transmitted map information is prohibited (in step S322). When the use of any transmitted map information is prohibited, the processing unit 1 acquires the corresponding map information for route determination result providing about the requested region from the DVD-ROM and delivers it to a unit which has made the request (in step S321), and finishes the map information acquiring processing. In contrast, when the use of any transmitted map information is not prohibited, the processing unit 1 delivers the transmitted map information for route determination result providing about the requested region to a unit which has made the request (in step S323), and finishes the map information acquiring processing.

Figure 17:
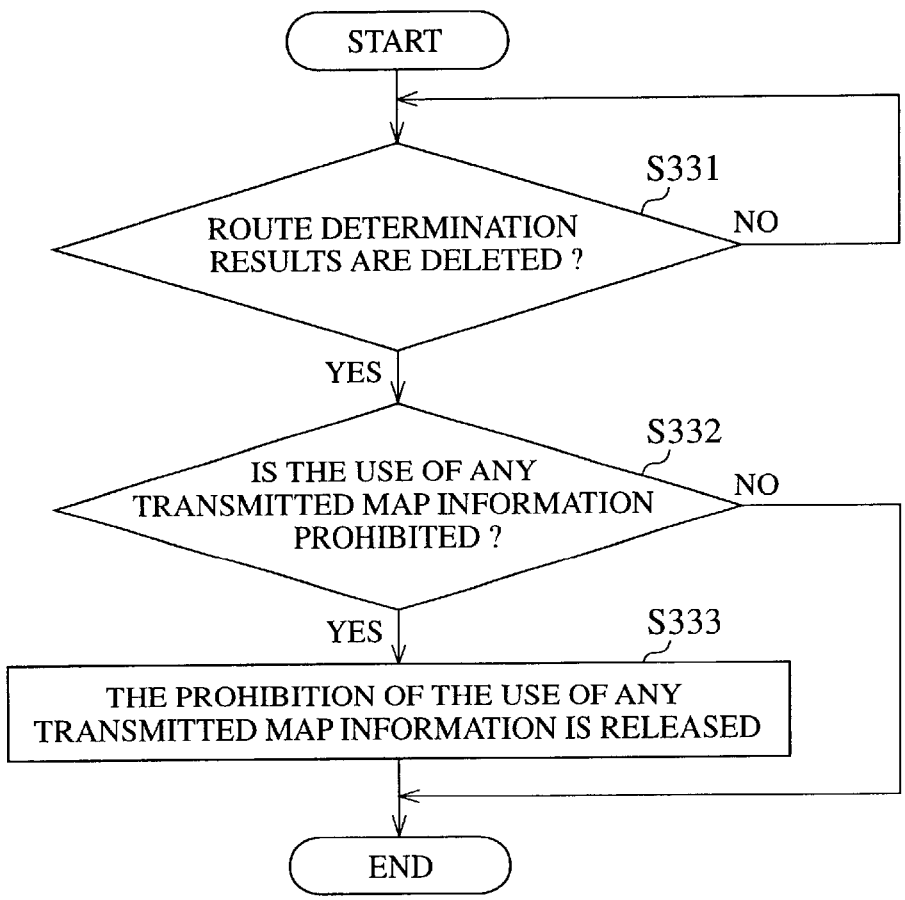
FIG. 17 is a diagram for explaining an operation of the map information processing apparatus according to embodiment 2of the present invention.
Figure 18:
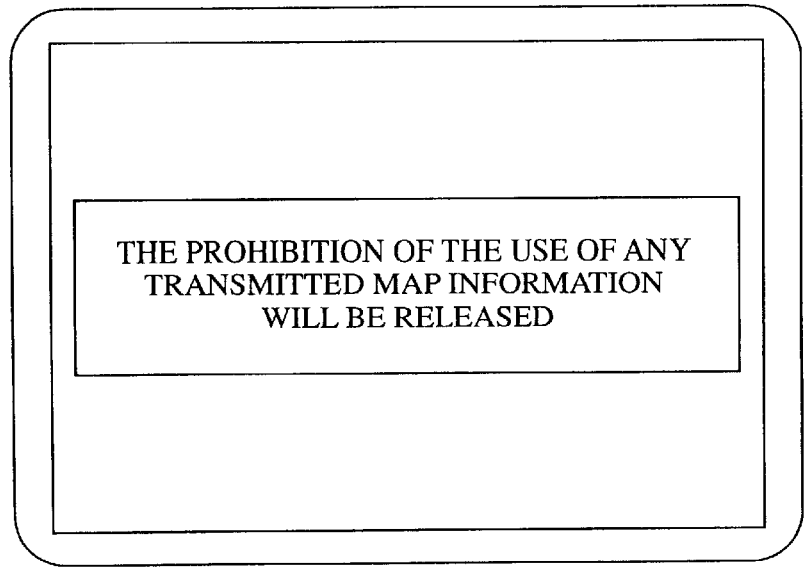
FIG. 18 is a diagram for explaining an operation of the map information processing apparatus according to embodiment 2 of the present invention.

FIG. 17 is a flow chart showing returning from a state in which the use of any transmitted map information is prohibited. When an instruction for deleting route determination results is provided (in step S331), the processing unit 1 releases the prohibition of the use of any transmitted map information (in step S333), if it is placed in the state in which the use of any transmitted map information is prohibited (in step S332). At this time, as shown in FIG. 18, the processing unit 1 displays a notification that the use of transmitted map information is restarted through the display unit 8. As an alternative, the processing unit 1 can notify users of the same contents through the voice guidance unit 9. Even when route determination results are deleted, the processing unit 1 finishes the map information acquiring processing without doing anything unless it is placed in the state in which the use of any transmitted map information is prohibited. When a user provides an instruction for deleting route determination results through an input unit 11, the processing unit 1 deletes the route determination results. When new route determination is carried out, the processing unit 1 also deletes previous route determination results. In either case, even if any route determination results are not actually deleted from a memory, it can be considered that an instruction for deleting route determination results is provided when a presentation of the previous route determination results to users is stopped.

Embodiment 3

Figure 19:
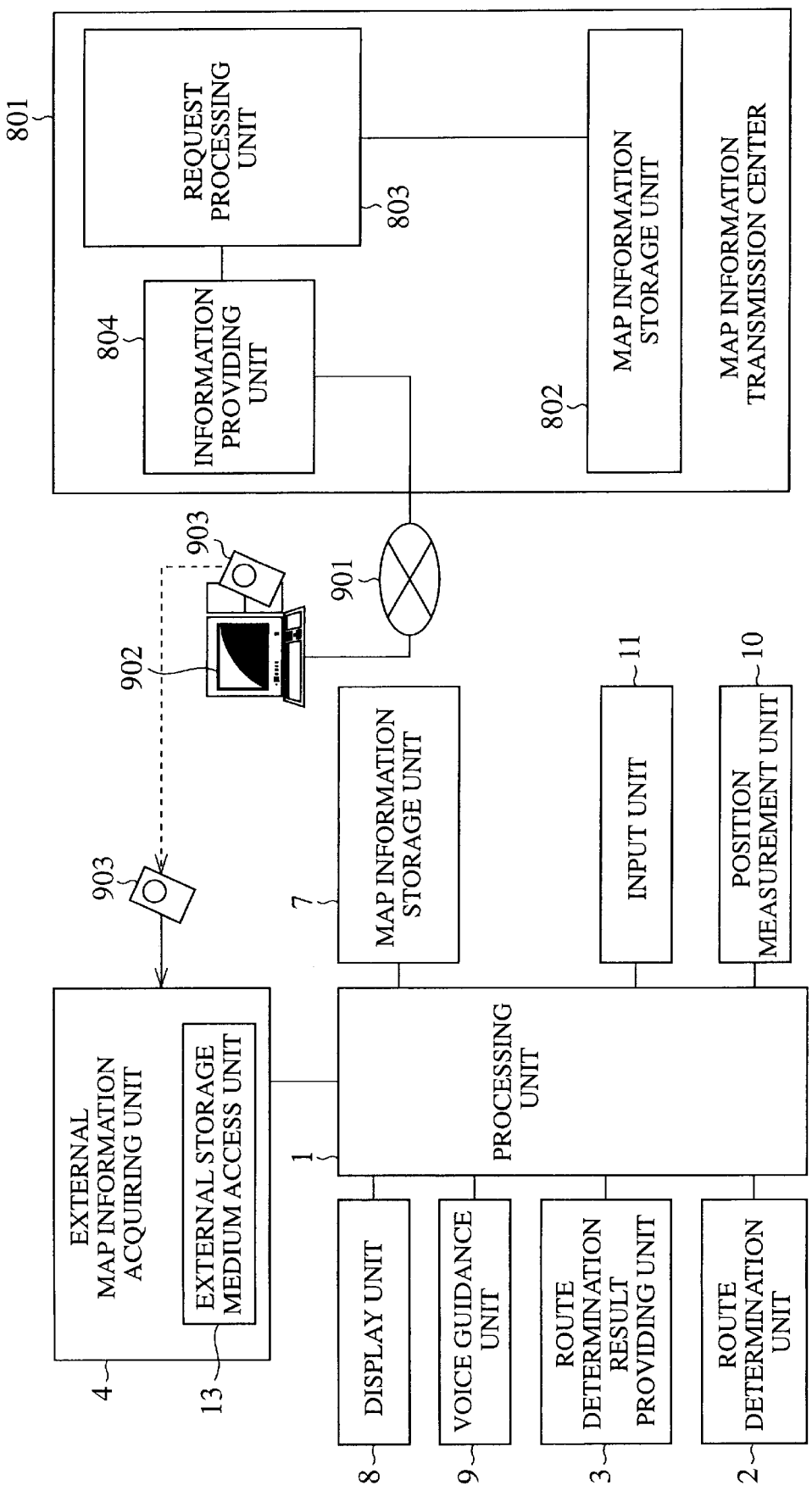
FIG. 19 is a block diagram showing the structures of a map information processing apparatus and a map information transmission center according to embodiment 3 of the present invention.

FIG. 19 is a block diagram showing the structures of a map information processing apparatus and a map information transmission center according to embodiment 3 of the present invention. In FIG. 19, the same reference numerals as shown in FIG. 1 denote the same components as those of the map information processing apparatus and the map information transmission center according to embodiment 1 of the present invention or like components. Reference numeral 13 denotes an external storage access unit disposed in an external map information acquiring unit 4, for reading information recorded in an external storage medium, reference numeral 901 denotes a network, such as the Internet or the one that provides dial-up connections, via which the map information processing apparatus can acquire information from the map information transmission center, reference numeral 902 denotes a personal computer that is disposed independently of the map information processing apparatus and that is connected to the map information transmission center 801 by way of the network 901, and reference numeral 903 denotes a nonvolatile memory card storage medium. Both the external storage access unit 13 of the map information processing apparatus and the personal computer 902 can write and read data in and from the memory card storage medium 903.

By operating the personal computer 902, users can acquire the most up-to-date map information that consists of at least map information for route determination and map information for route determination result providing from the map information transmission center 801 and store them in the memory card storage medium 903 in advance. The memory card storage medium 903 in which the map information is stored can be inserted into the map information processing apparatus so that the map information can be used by the map information processing apparatus. As a result, users can use the most up-to-date map information without communication cost when using the map information processing apparatus.

Figure 20:
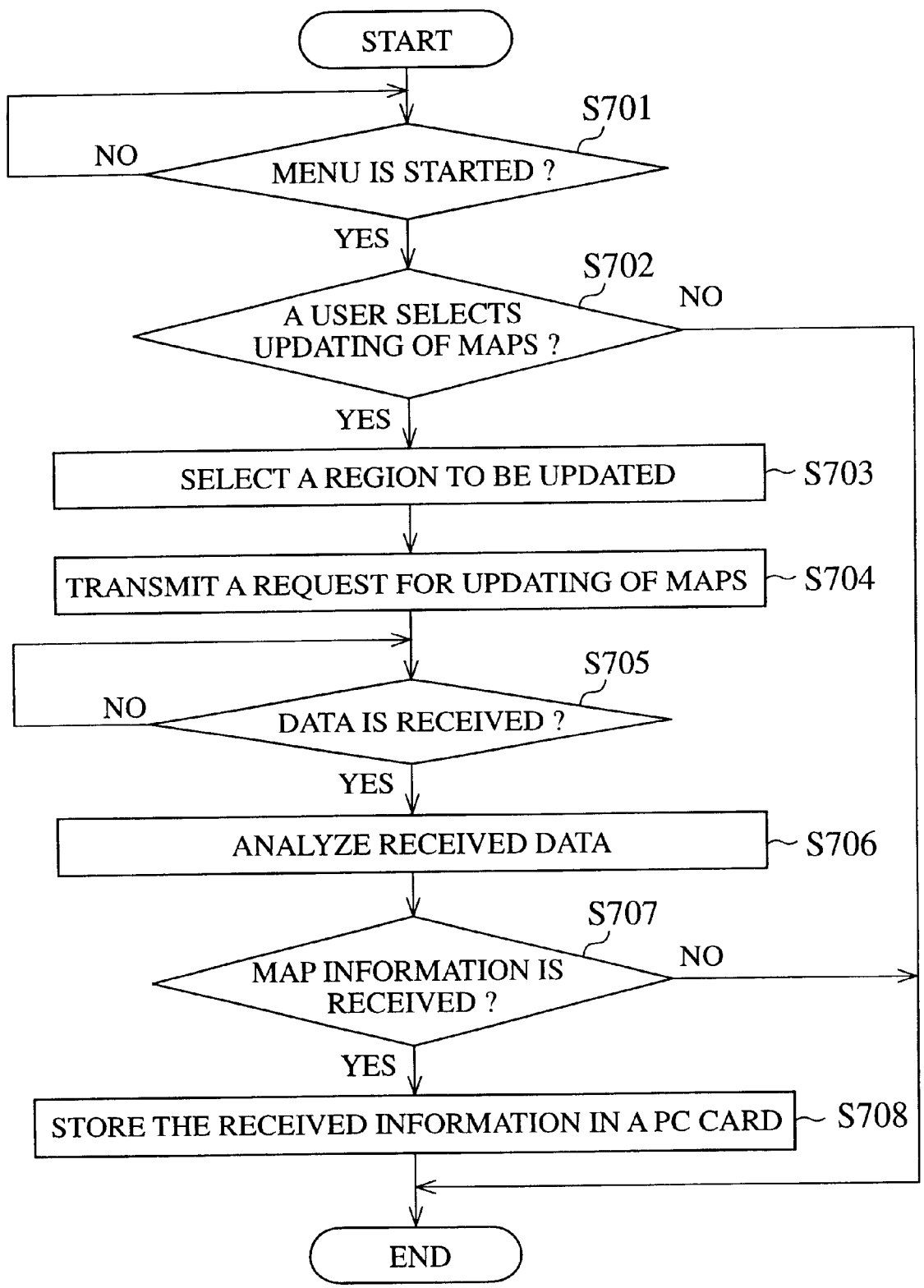
FIG. 20 is a diagram showing a flow chart of map information acquiring processing performed by a personal computer according to embodiment 3 of the present invention.

FIG. 20 is a flow chart of map information acquiring processing performed by the personal computer 902. A user operates the personal computer 902 so as to start a display of a menu screen (instep S701). Then the user can select updating of maps from the menu screen (in step S702), and can select a region to be updated (in step S703). The selection of a region to be updated is implemented by selecting a region from the screen as shown in FIG. 7, as in the case of embodiment 1. The selected region can be one of a plurality of divided areas, such as a plurality of administrative divisions, or a plurality of cities, towns, and villages other than a plurality of regional divisions as shown in FIG. 7. As an alternative, the selected region can be one of divided areas, such as North Japan, East Japan, and West Japan, which are larger than those shown in FIG. 7. Instead, the selected region can be an arbitrary region specified by the user, or an arbitrary region which is automatically defined by the system. The personal computer 902 then advances to a data reception waiting step (step S705), a analysis step of analyzing received data (step S706), and a determination step (step S707) of determining whether or not map information about the selected region is included in the received data after transmitting a request for updating of maps (in step S704). Those steps are the same as the steps S105 to S107 as shown in FIG. 4. Finally, the personal computer stores the received information in the PC card that is a memory card storage medium (in step S708) and finishes the map information acquiring processing. The processing performed by the map information transmission center 801 is the same as that performed by that of above-mentioned embodiment 1.

Figure 21:
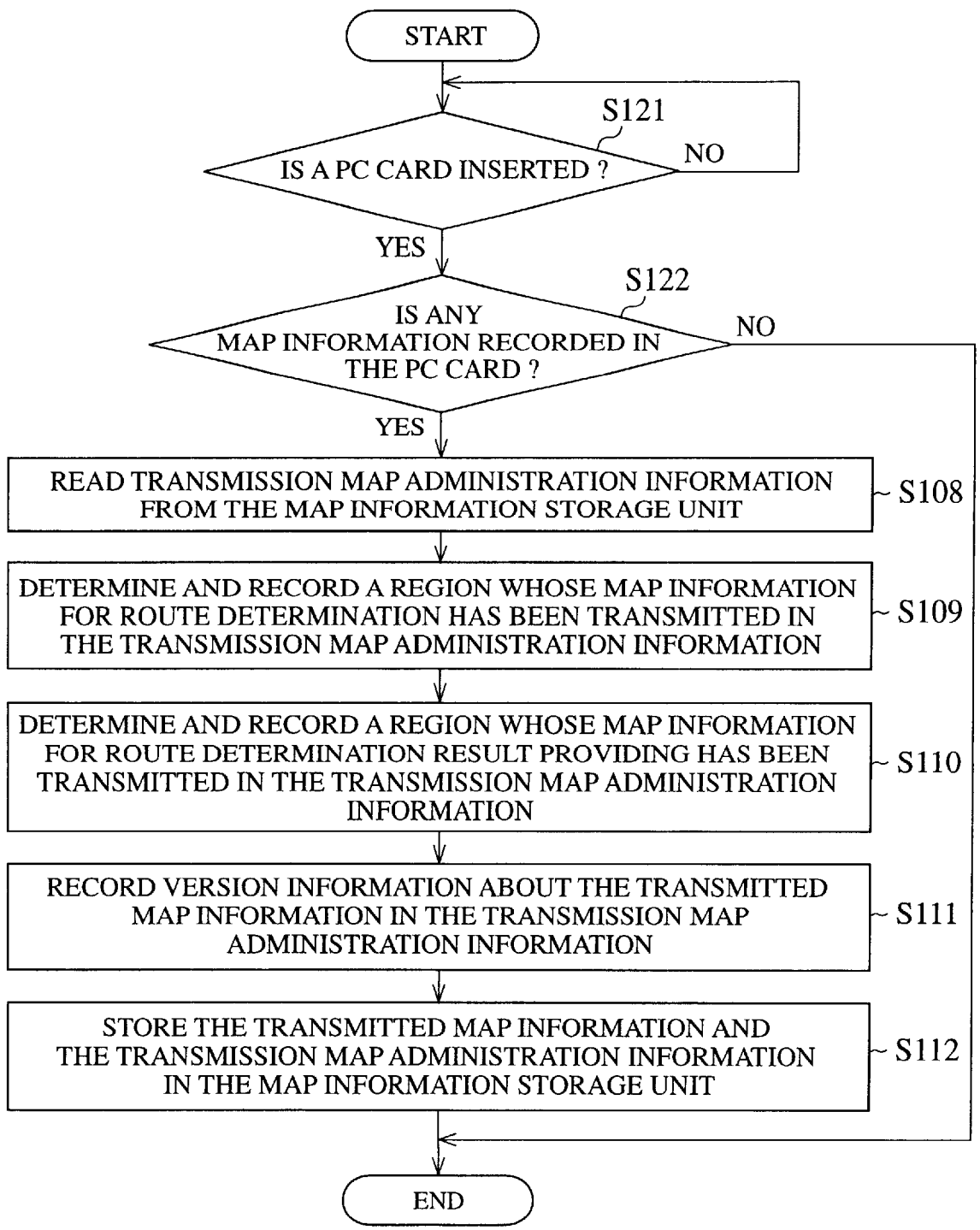
FIG. 21 is a diagram showing a flow chart of map information acquiring processing performed by the map information processing apparatus according to embodiment 3 of the present invention.

FIG. 21 is a flow chart showing a process of acquiring map information from the PC card which is performed by the map information processing apparatus. The same characters as shown in FIG. 4 denote the same steps or like steps. When the PC card is inserted into the map information processing apparatus, (in step S121), the processing unit 1 determines whether or not some map information is recorded in the PC card (in step S122). If no map information is recorded in the PC card, the processing unit 1 finishes the processing. When some map information is recorded in the PC card, the processing unit 1 reads transmission map administration information from the map information storage unit 7 (in step S108), and then records a region whose map information for route determination has been transmitted to the map information processing apparatus and is stored in the PC card and a region whose map information for route determination result providing has been transmitted to the map information processing apparatus and is stored in the PC card in the read transmission map administration information (in steps S109 and S110). In addition, the processing unit 1 records the version of each transmitted map information in the transmission map administration information (in step S111) and stores the map information written into the PC card and the transmission map administration information in which the version of each transmitted map information has been recorded in the map information storage unit 7 (in step S112).

Figure 22:
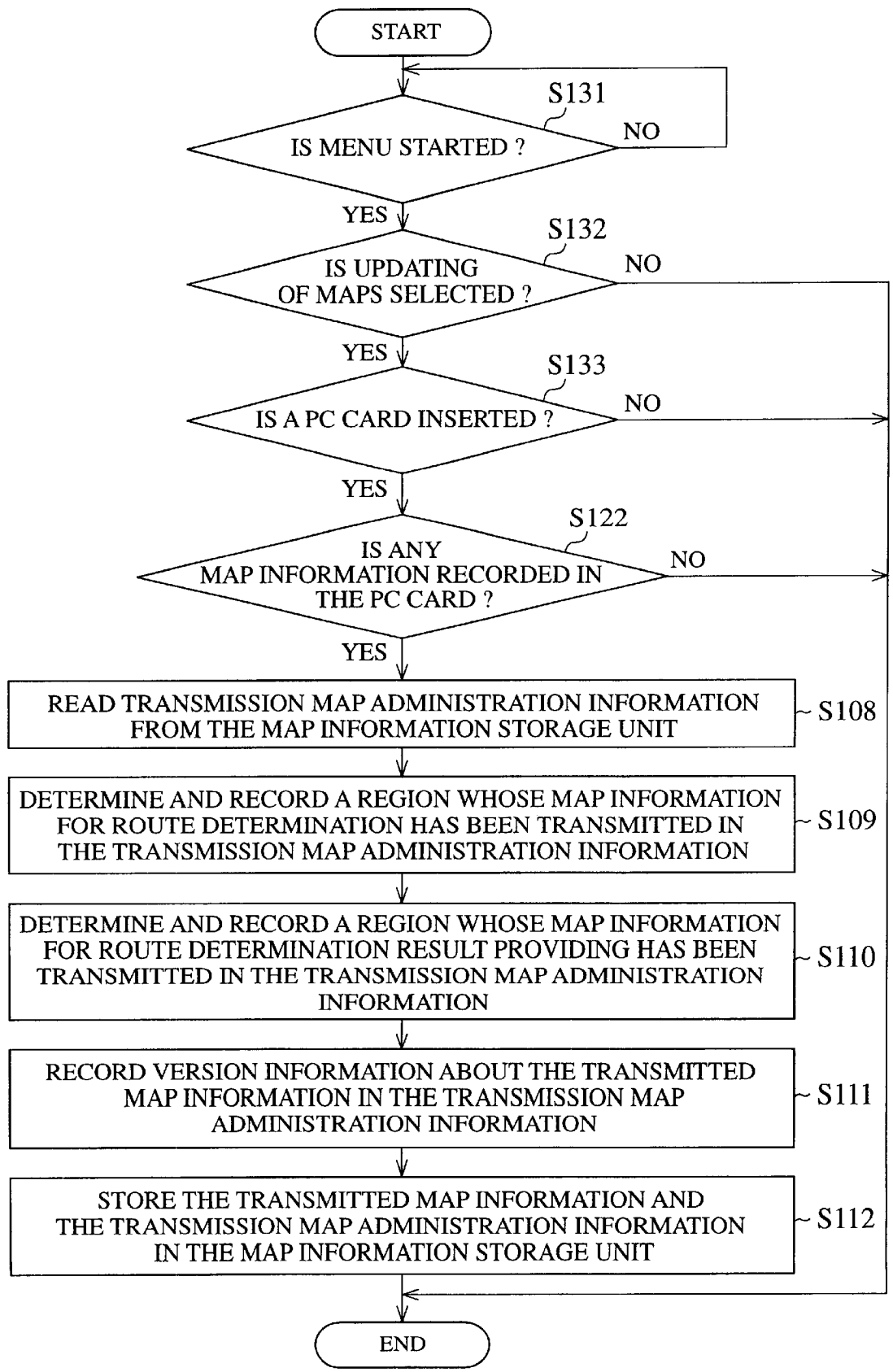
FIG. 22 is a diagram showing a flow chart of another example of the map information acquiring processing performed by the map information processing apparatus according to embodiment 3 of the present invention.

FIG. 22 is a flow chart showing another example of the process of acquiring map information from the PC card, which is performed by the map information processing apparatus. In this variant, updating of maps can be carried out according to an instruction from users. The same characters as shown in FIGS. 4 and 21 denote the same steps or like steps. When a user provides an instruction for starting a display of a menu through an input unit 11 (in step S131), a menu screen as shown in FIG. 6 is displayed on a display unit 8. This processing is the same as the map information updating processing performed by the map information processing apparatus according to embodiment 1. When updating of maps is selected from this menu (in step S132), the processing unit 1 determines whether or not the PC card is inserted into the map information processing apparatus (in step S133). The processing unit 1 finishes the processing unless the PC card is inserted into the map information processing apparatus. In contrast, when the PC card is inserted into the map information processing apparatus, the processing unit 1 determines whether or not some map information is recorded in the PC card (in step S122), and, after that, performs map information acquiring processing which is the same as that as shown in FIG. 21.

Embodiment 4

Figure 23:
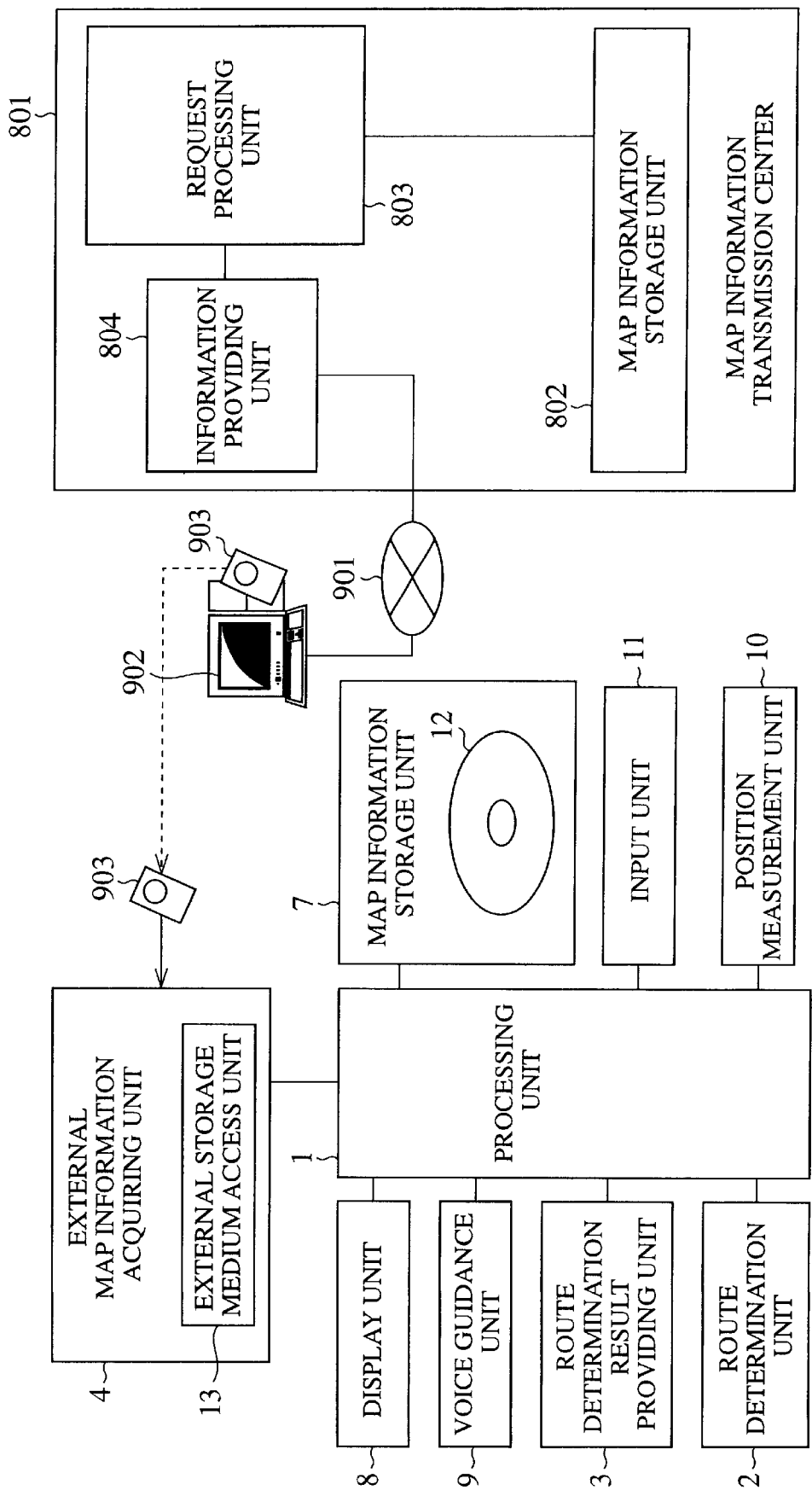
FIG. 23 is a block diagram showing the structures of a map information processing apparatus and a map information transmission center according to embodiment 4 of the present invention.

FIG. 23 is a block diagram showing the structures of a map information processing apparatus and a map information transmission center according to embodiment 4 of the present invention. In accordance with this embodiment 4, the map information processing apparatus has the same structure as that of embodiment 3, and a map information storage unit 7 is provided with a DVD-ROM 12 in which at least map information for route determination and map information for route determination results are recoded in advance, like the map information storage unit 7 of embodiment 2. In FIG. 23, the same reference numerals as shown in FIG. 19 denote the same components as those of the map information processing apparatus and the map information transmission center according to embodiment 3 of the present invention or like components.

In accordance with this embodiment 4, when performing route determination and when displaying route determination results, the map information processing apparatus uses map information acquired from a PC card for regions whose most up-to-date map information is recorded in the PC card, and map information of an older version recorded in the DVD-ROM for regions whose most up-to-date map information is not recorded in the PC card. The map information storage unit 7 can have either a CD-ROM or a hard disk drive instead of the DVD-ROM 12.

When using map information about a region, which is recorded in the PC card, and map information about another region, which is not recorded in the PC card, at the same time, a route determination unit 2 stops the use of any map information recorded in the PC card and uses map information stored in the DVD-ROM 12 even for a region whose map information is recorded in the PC card, thereby solving a problem encountered with the route determination caused by the coexistence of different versions of map information.

A flow chart showing use of the map information stored in the map information storage unit 7 and a flow chart showing returning from a state in which the use of any transmitted map information is prohibited are the same as those of embodiment 2 as shown in FIGS. 15 and 17. A flow chart showing a process of acquiring map information from the map information transmission center 801 is the same as that of embodiment 3.

As a result, users can use the most up-to-date map information without communication cost when using the map information processing apparatus. Furthermore, users are allowed to use map information about a region even when any map information about the region has not been transmitted to the map information processing apparatus.

Embodiment 5

Figure 24:
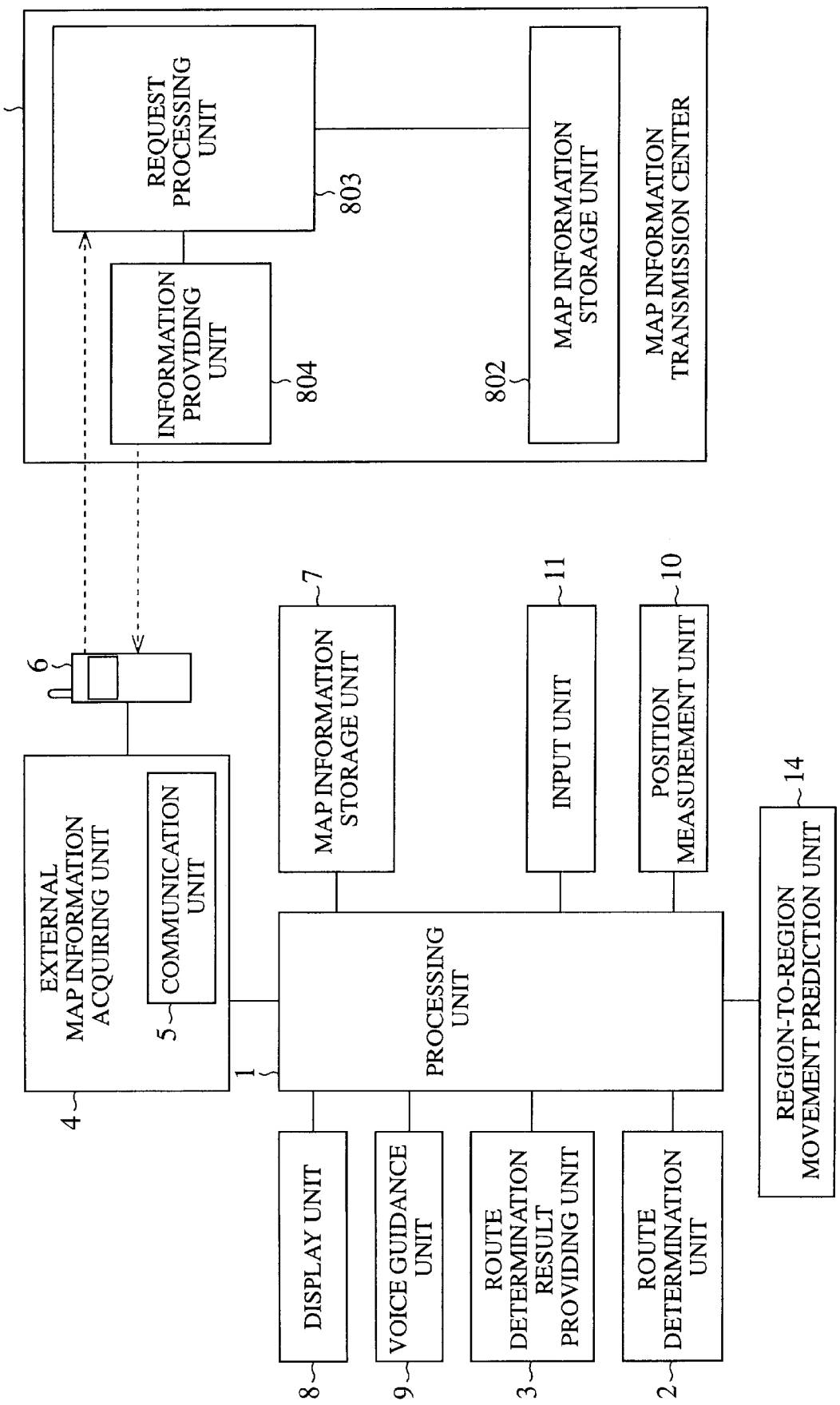
FIG. 24 is a block diagram showing the structures of a map information processing apparatus and a map information transmission center according to embodiment 5 of the present invention.

FIG. 24 is a block diagram showing the structures of a map information processing apparatus and a map-information transmission center according to embodiment 5 of the present invention. In FIG. 24, the same reference numerals as shown in FIG. 1 denote the same components as those of the map information processing apparatus and the map information transmission center according to embodiment 1 of the present invention or like components. Reference numeral 14 denotes a region-to-region movement prediction unit for determining whether a terminal equipped with the map information processing apparatus reaches the boundary of a unit region of map information for route determination result providing including a current position of the terminal.

When the terminal reaches the boundary of a unit region of map information for route determination result providing including the current position of the terminal, unless the map information for route determination result providing about a next region to which the terminal will move has been transmitted to the map information processing apparatus, the map information processing apparatus can provide route determination results smoothly by downloading the map information from the map information transmission center before the terminal will move to the next region. In accordance with this embodiment, the region-to-region movement prediction unit 14 can determine the current position of the terminal and download necessary map information from the map information transmission center in advance.

Figure 25:
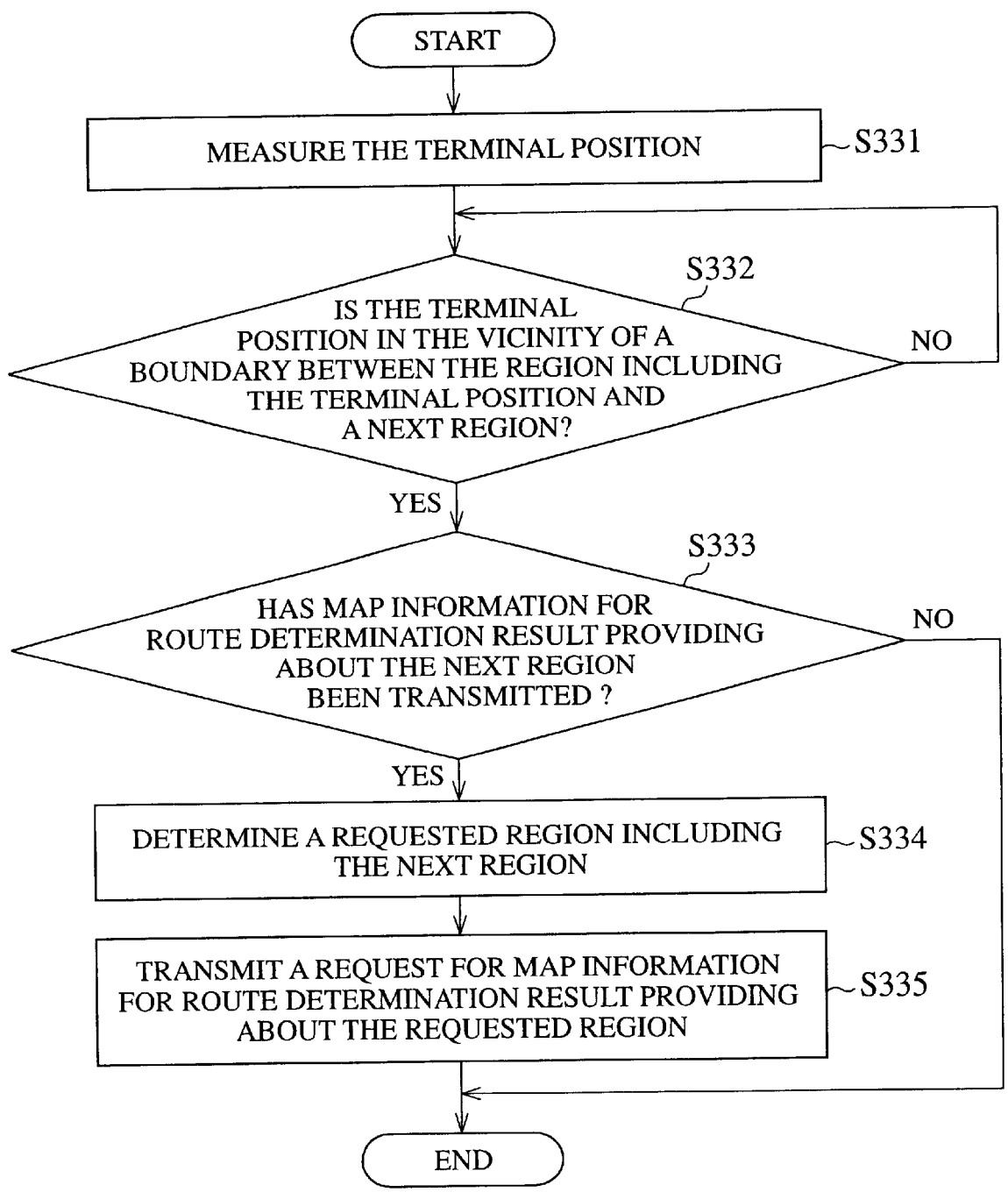
FIG. 25 is a diagram showing a flow chart of map information request processing performed by the map information processing apparatus according to embodiment 5 of the present invention.
Figure 26:
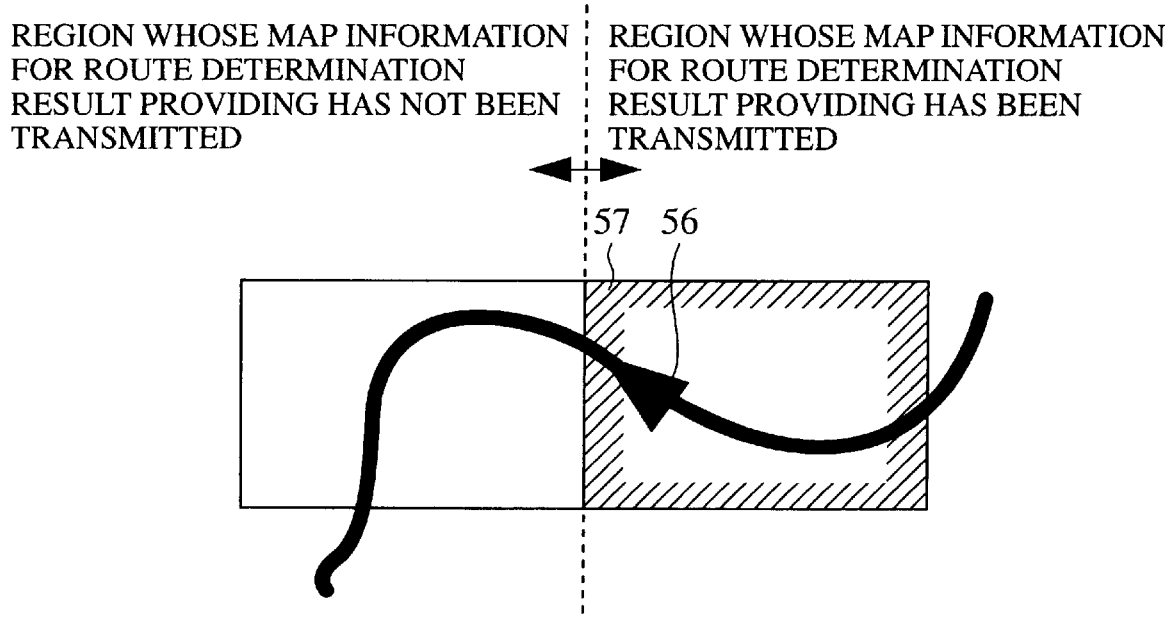
FIG. 26 is a diagram for explaining an operation of the map information processing apparatus according to embodiment 5 of the present invention.

FIG. 25 is a flow chart showing a main operation of the map information processing apparatus of this embodiment. When a position measurement unit 10 measures the current position of the terminal (in step S331), the region-to-region movement prediction unit 14 determines whether or not the measured current position is placed in the vicinity of the boundary of a unit region of the map information for route determination result providing which includes the current position of the vehicle (in step S332). The vicinity of the boundary of a unit region will be explained with reference to FIG. 26. In the example of FIG. 26, the current position of the terminal 56 exists in a unit region on a right-hand side of FIG. 26, whose map information for route determination result providing has already been transmitted to the map information processing apparatus. This region can be determined from the map information for route determination result providing. An area having a constant distance or less from the boundary of a unit region is referred to as the vicinity of the boundary of the unit region. In FIG. 26, the hatched area 57 is the vicinity of the unit region whose map information for route determination result providing has already been transmitted to the map information processing apparatus. The region-to-region movement prediction unit 14 repeats step S332 until determining that the measured current position is placed in the vicinity of a unit region in step S332, as shown in FIG. 25. The region-to-region movement prediction unit 14 further determines whether or not the map information for route determination result providing about the next region to which the terminal will move has been transmitted to the map information processing apparatus when determining that the vehicle is placed in the vicinity of the boundary of a unit region (in step S333). The region-to-region movement prediction unit 14 finishes the processing when the map information for route determination result providing about the next region to which the terminal will move has been transmitted to the map information processing apparatus. In contrast, when determining that no map information for route determination result providing about the next region to which the terminal will move has been transmitted to the map information processing apparatus, the region-to-region movement prediction unit 14 determines a region of the map information for route determination result providing which is to be transmitted from the map information transmission center to the map information processing apparatus (in step S334) so that the map information processing apparatus can make a request of the map information transmission center 801 for map information. At this time, the region-to-region movement prediction unit 14 determines the region so that the region includes at least the next region to which the terminal will move. When determining the region whose map information for route determination result providing is to be transmitted, the region-to-region movement prediction unit 14 makes a request of the map information transmission center 801 for transmission of the map information for route determination result providing about the next region (in step S335). After that, when the map information processing apparatus can receive the map information correctly from the map information transmission center 801, it uses this map information in the same way that the map information processing apparatus of embodiment 1 does.

Figure 28:
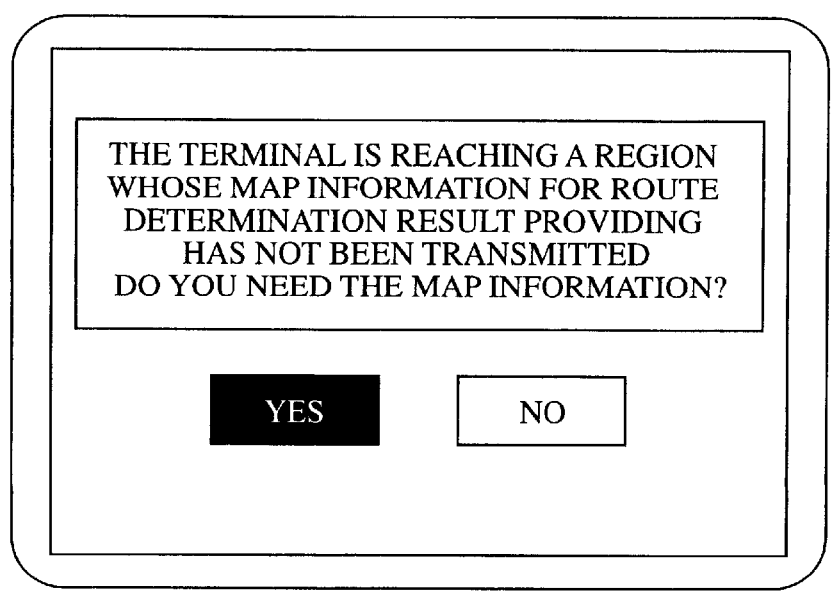
FIG. 28 is a diagram for explaining an operation of the map information processing apparatus according to embodiment 5 of the present invention.

FIG. 27 is a flow chart showing another example of the process of making a request for map information in accordance with this embodiment. The same reference characters as shown in FIG. 25 denote the same steps or like steps. Current position measurement (in step S331), determination of the vicinity of the boundary of a unit region (in step S332), and determination of whether or not transmission of map information about a next region has been performed (in step S333) are the same as those as shown in FIG. 25. As shown in FIG. 27, the processing unit 1 checks to see whether users want updating of maps by producing a screen display as shown in FIG. 28 by using a display unit 8, when determining that the map information for route determination result providing about the next region has not been transmitted to the map information processing apparatus (in step S336). When a user inputs the will to update an on-screen map through an input unit 11 (in step S337), the processing unit 1 produces a screen display to allow the user to determine a region to be updated by using the display unit 8 (in step S338). The display unit 8 can produce a screen display as shown in FIG. 7, like that of embodiment 1. When the region to be updated is determined by the user through the input unit 11 (in step S339), the map information processing apparatus makes a request of the map information transmission center 801 for map information for route determination result providing about the region to be updated (in step S335). After that, when the map information processing apparatus can receive the map information correctly from the map information transmission center 801, it uses this map information in the same way that the map information processing apparatus of embodiment 1 does. In this example, users can input a region to be updated in steps S338 and S339. As an alternative, the processing unit 1 of the map information processing apparatus can automatically determine a region to be updated including the next region.

Embodiment 6

FIG. 29 is a block diagram showing the structures of a map information processing apparatus and a map information transmission center according to embodiment 6 of the present invention. In accordance with this embodiment 6, the map information processing apparatus has the same structure as that of embodiment 5, and a map information storage unit 7 is provided with a DVD-ROM 12 in which at least map information for route determination and map information for route determination results are recoded in advance, like the map information storage unit 7 of embodiment 2.

As a result, the map information processing apparatus can provide route determination results smoothly by using map information about regions when no map information about the regions has been transmitted to the map information processing apparatus.

Embodiment 7

When some different versions of map information (for example, old map information recorded in a DVD-ROM and new map information transmitted from outside a map information processing apparatus) coexist and are used, the map information processing apparatus may exhibit unpredictable behavior if a terminal equipped with the map information processing apparatus reaches a boundary between two regions having different versions of map information and the map information processing apparatus uses connection information about connections between the two regions. The map information processing apparatus can normally operate in such a case by disabling the connection information through a processing unit 1. In this embodiment 7, such a disabling process will be described.

Figure 30:
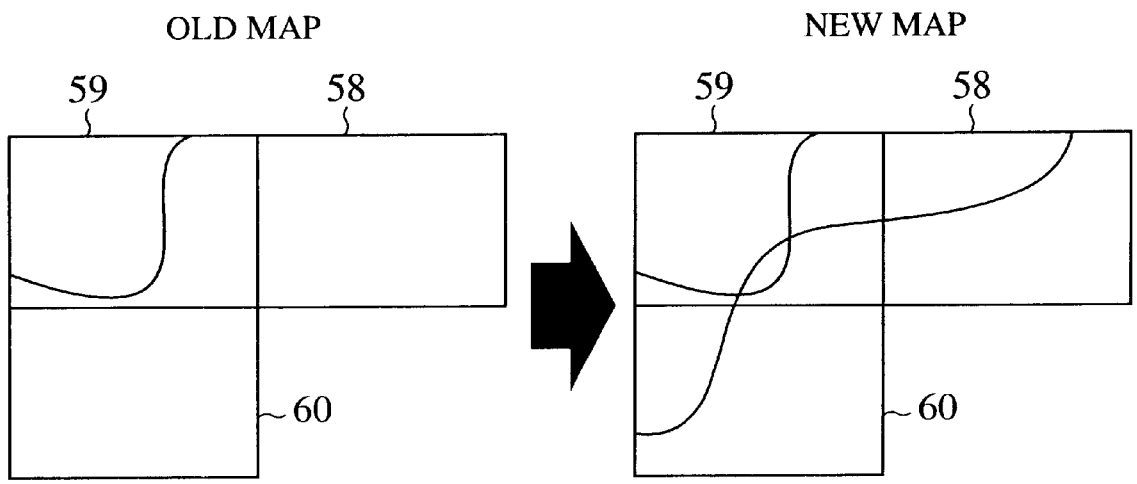
FIG. 30 is a diagram for explaining an operation of a map information processing apparatus according to embodiment 7 of the present invention.

FIG. 30 is a diagram for explaining a process of disabling connection information performed by the map information processing apparatus according to this embodiment 7, and shows a change in the map information about regions. In the example of FIG. 30, it is assumed that a new road passing through regions 58 to 60 is open and this results in a change in the map information.

Figure 31:
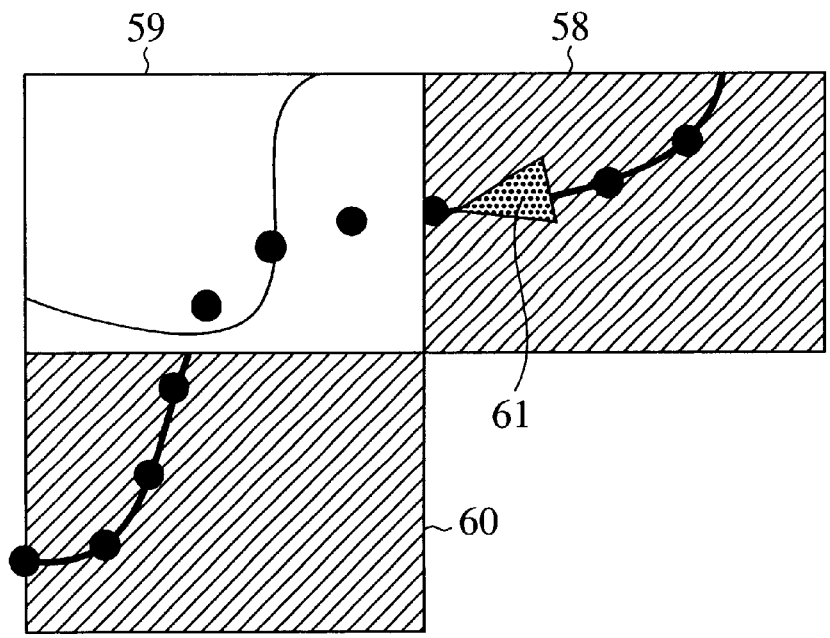
FIG. 31 is a diagram for explaining an operation of the map information processing apparatus according to embodiment 7 of the present invention.

FIG. 31 shows an operation of the map information processing apparatus in accordance with this embodiment 7 when the terminal reaches the boundary between the two regions 58 and 59. The map information processing apparatus provides a map based on the most up-to-date map information for route determination result providing transmitted thereto for each of the hatched regions 58 and 60. In contrast, because the most up-to-date map information about the region 59 is not transmitted to the map information, processing apparatus, the map information processing apparatus provides a map for the region 59 based on map information for route determination result providing recorded in the DVD-ROM. The map information processing apparatus then provides route determination results by using the map information for route determination result providing about each of the three regions 58 to 60. At this time, the most up-to-date map information for route determination about a region including the three regions 58 to 60 has been transmitted to the map information processing apparatus, and the map information processing apparatus performs route determination by using this transmitted most up-to-date map information for route determination.

Information about the new road is included in the map information for route determination result providing about each of the two hatched regions 58 and 60. In contrast, no information about this new road is included in the map information for route determination result providing about the other region 59. The route determination results are indicated by a heavy dotted line. In FIG. 31, reference numeral 61 denotes the current position of the terminal which is measured by a position measurement unit 10.

Figure 32:
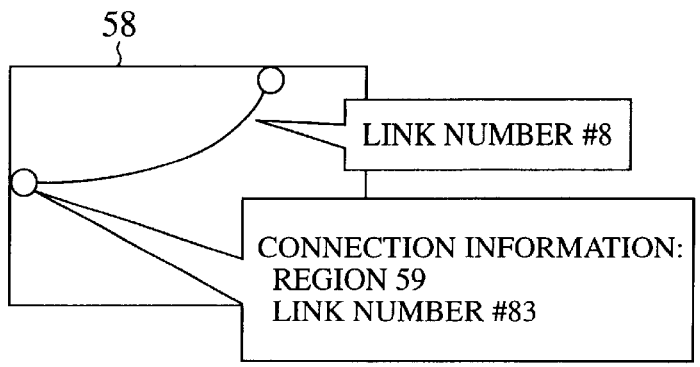
FIGS. 32A to 32C are diagrams for explaining an operation of the map information processing apparatus according to embodiment 7 of the present invention.
Figure 32:
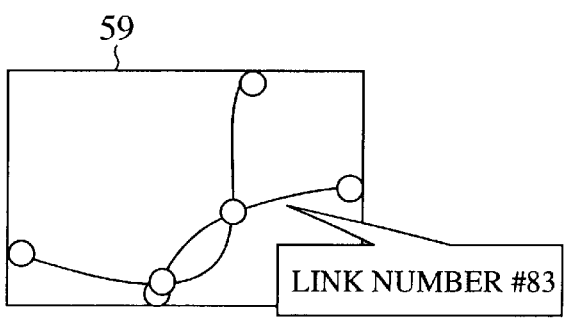
Figure 32:
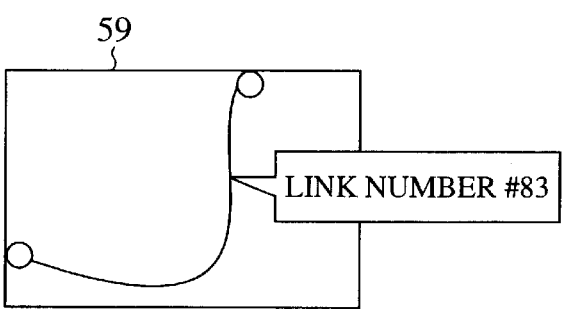

FIGS. 32A, 32B, and 32C show the contents of map information for route determination result providing. FIG. 32A shows new map information for route determination result providing about the region 58, which has been transmitted to the map information processing apparatus. FIG. 32B shows new map information for route determination result providing about the region 59, which has not been transmitted to the map information processing apparatus. FIG. 32C shows old map information for route determination result providing about the region 59, which is recorded in the DVD-ROM 12 of the map information processing apparatus. In map information for route determination result providing, each road is identified by a link number that is uniquely defined. In FIG. 32A, the link number of the road newly added to this region is 8. One end of the road on the boundary between the regions 58 and 59 has connection information used to identify the new road in the map information about the next region 59. The connection information shows that the road in the region 58 specified by the link number 8 is connected to the road of the link number 83 in the region 59. If the map information for route determination result providing about the region 59 has the same version as that about the region 58, the road of the link number 83 is properly connected to one end of the road of the link number 8 in the region 58, as shown in FIG. 32B. However, as previously mentioned, when old map information for route determination result providing is used for the region 59, as shown in FIG. 32C, the road of the link number 83 specified by the connection information provided by one end of the road of the link number 8 in the region 58 is not properly connected to the end of the road of the link number 8 in the region 58. This results in logical contradiction among the two pieces of map information about the next regions, and this contradiction may cause the map information processing apparatus to exhibit unpredictable behavior.

Figure 33:
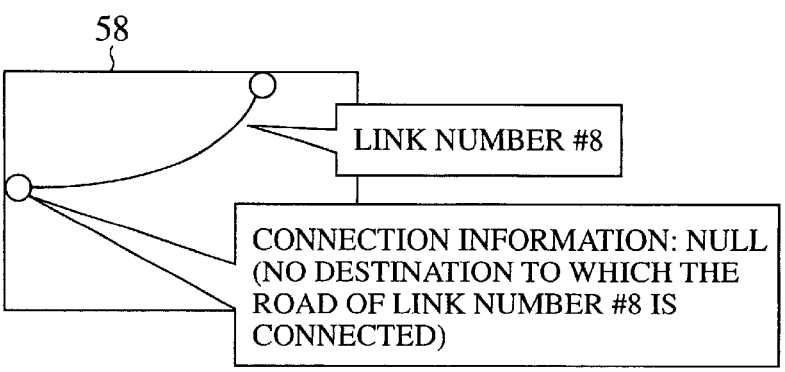
FIG. 33 is a diagram for explaining an operation of the map information processing apparatus according to embodiment 7 of the present invention.

FIG. 33 shows a solution provided by this embodiment. For the transmitted map information for route determination result providing about the region 58, the connection information about a connection with the region 59, which uses the not-transmitted map information for route determination result providing, is disabled. In other words, the connection information about a connection with one end of the road of the link number 8 is changed to information showing that there is no road in the region 59 to be connected with the end of the road of the link number 8. As a result, the logical contradiction of the map information is canceled.

Figure 34:
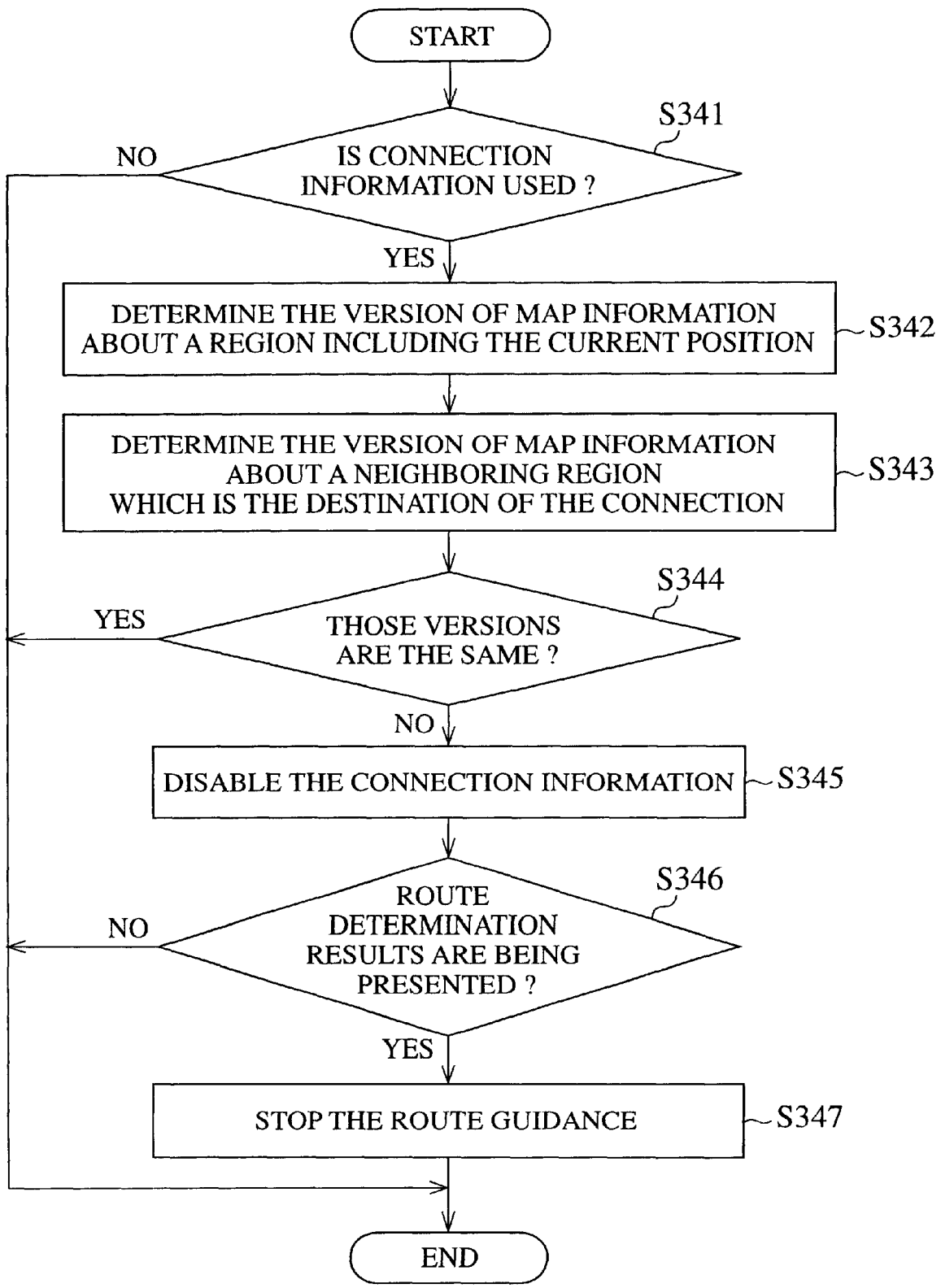
FIG. 34 is a diagram for explaining a connection disabling process of disabling a connection performed by the map information processing apparatus according to embodiment 7 of the present invention.

FIG. 34 shows a flow chart of a process of disabling connection information. For map information for route determination result providing, when connection information about a connection with a next region is used (in step S341), the processing unit 1 determines version information about the version of the map information for route determination result providing used for a region where the terminal is traveling now (in step S342), and also determines version information about the version of the map information for route determination result providing used for the next region which is the destination of the above-mentioned connection (in step S343). When these two versions agree with each other, the processing unit 1 finishes the processing. When the two versions differ from each other (in step S344), the processing unit 1 disables the connection information (in step S345). At this time, when route determination results are provided (in step S346), the processing unit 1 stops the route guidance (in step S347) and finishes the processing. In contrast, when no route determination results are provided, the processing unit 1 finishes the processing.

Figure 35:
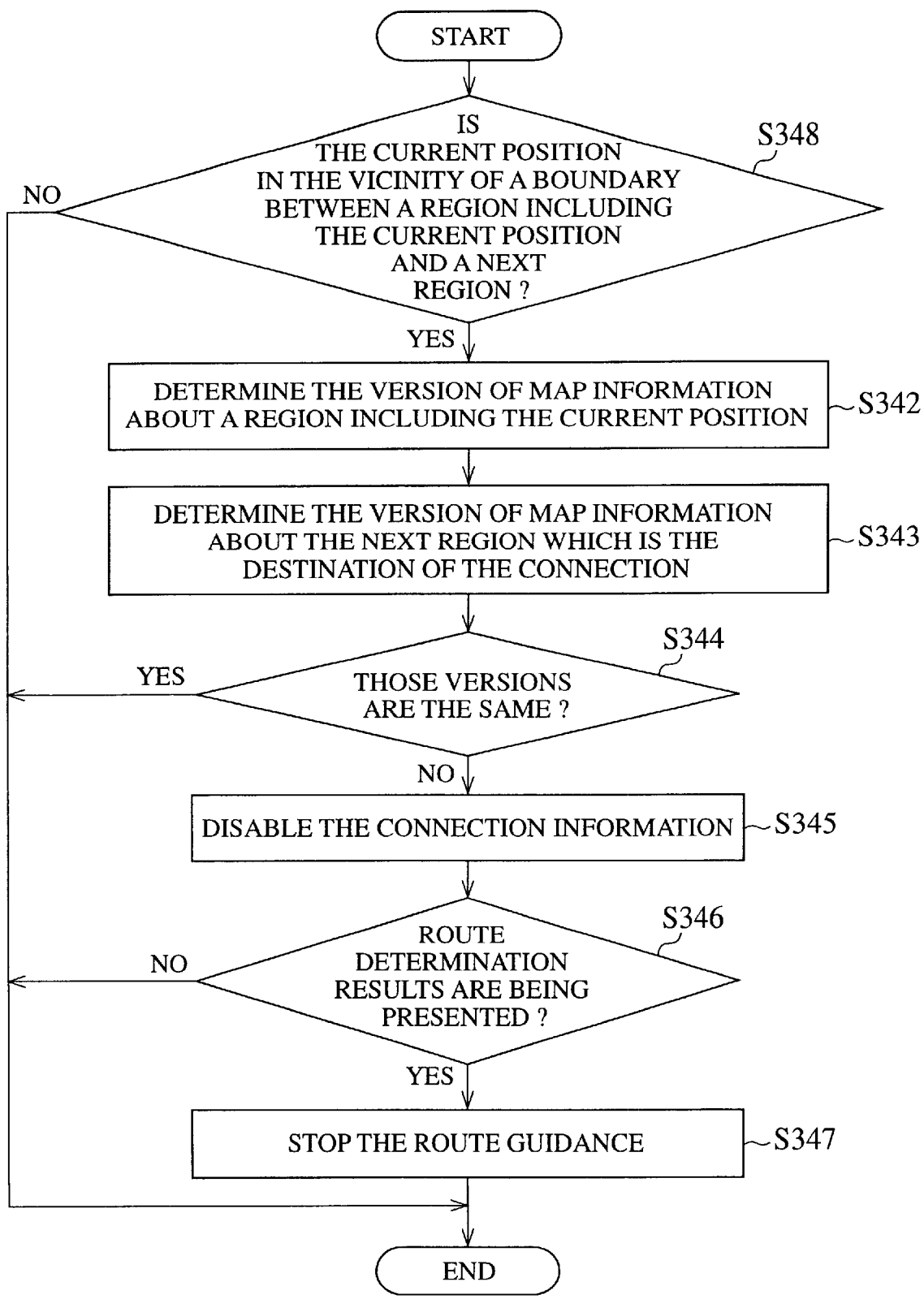
FIG. 35 is a diagram for explaining another example of the connection disabling process performed by the map information processing apparatus according to embodiment 7 of the present invention.

FIG. 35 is a flow chart showing another example of the process of disabling connection information in accordance with this embodiment. The same reference numerals as shown in FIG. 34 denote the same steps or like steps. In the example of FIG. 34, the processing unit 1 determines and compares the version information about the version of the map information about a region including the current position and the version information about the version of the map information about a next region to which the terminal will move with each other when the connection information about a connection with the next region is used for the map information for route determination result providing about the region including the current position. In contrast, in the other example of FIG. 35, when the current position of the terminal measured by the position measurement unit 10 is placed in the vicinity of the boundary between the two regions (in step S348), the processing unit 1 compares the version information about the version of the map information about the region including the current position and the version information about the version of the map information about the next region to which the terminal will move with each other. After that, the processing unit 1 operates in the same way as the example of FIG. 34.

Figure 36:
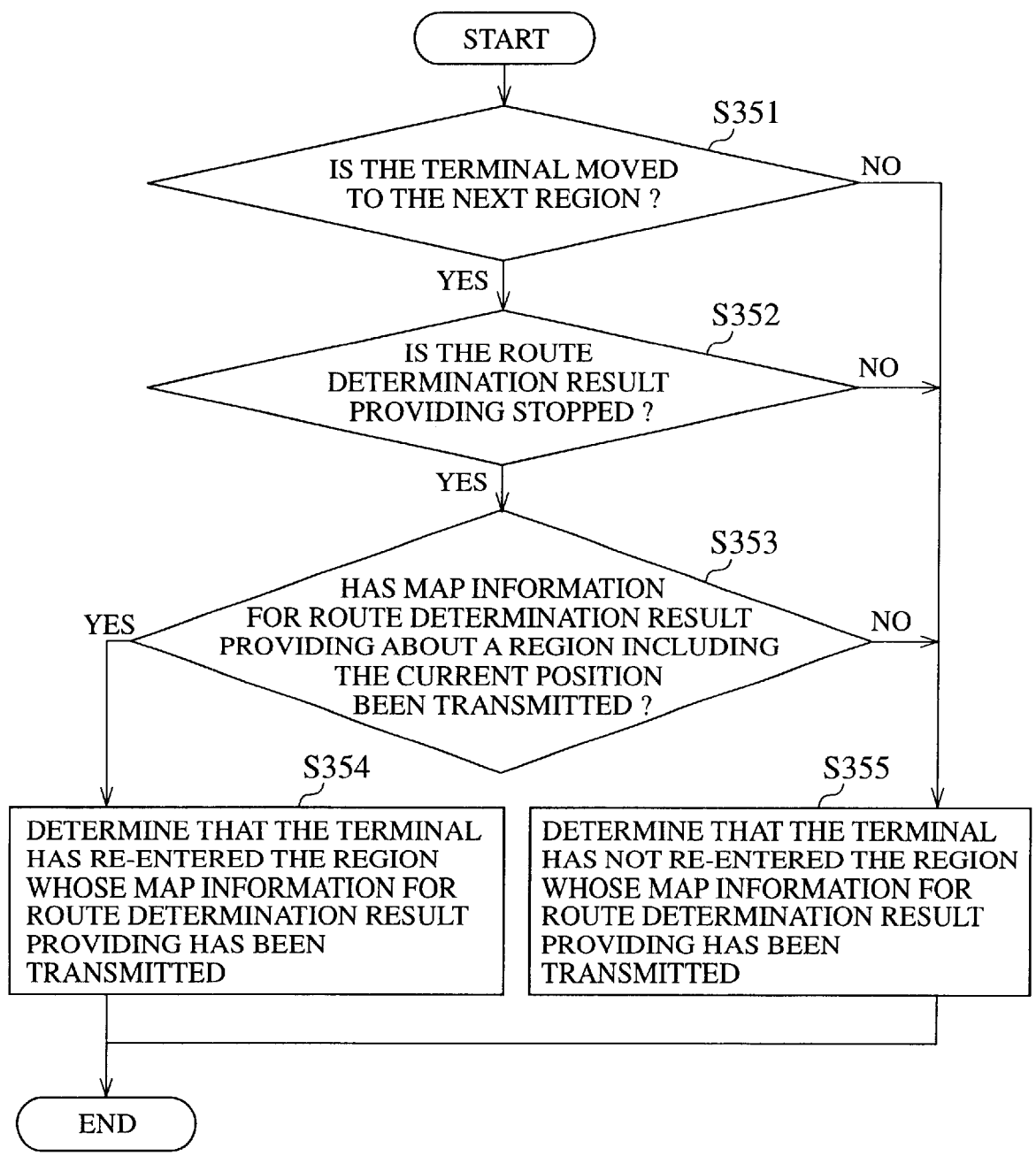
FIG. 36 is a diagram for explaining an operation of the map information processing apparatus according to embodiment 7 of the present invention.
Figure 37:
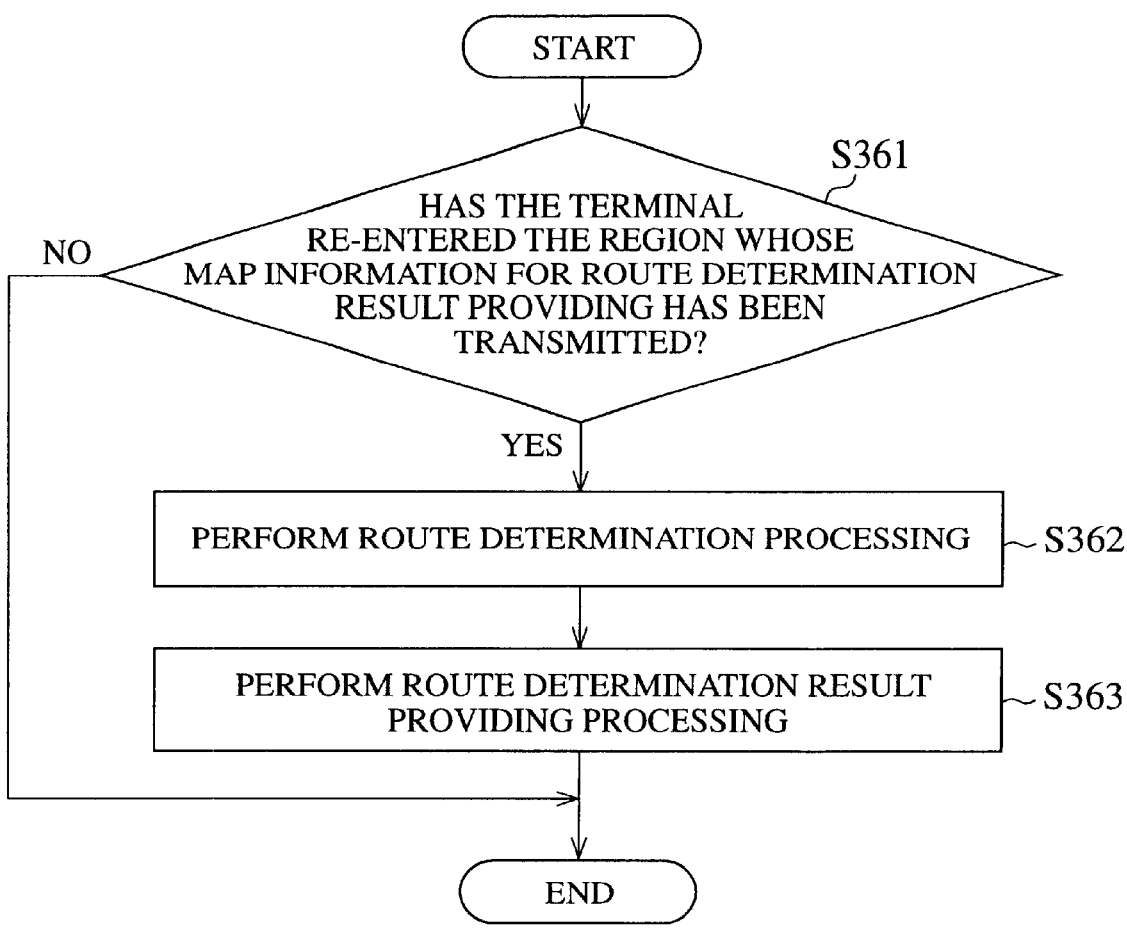
FIG. 37 is a diagram for explaining an operation of the map information processing apparatus according to embodiment 7 of the present invention.

FIG. 36 is a flow chart showing a process of determining whether the terminal has entered a region whose most up-to-date map information for route determination result providing has been transmitted to the map information processing apparatus while the route guidance is stopped. In FIG. 36, an operation of the processing unit 1 is shown. When the terminal is moved to the next region (instep S351) and the route guidance is stopped (in step S352), if the map information for route determination result providing about a region including the current position has been transmitted to the map information processing apparatus (in step S353), the processing unit 1 determines that the terminal has re-entered the region whose map information for route determination result providing has been transmitted (in step S354). The processing unit 1 determines that the terminal has not re-entered the region whose map information for route determination result providing has been transmitted otherwise (in step S355). FIG. 37 is a flow chart showing an operation of the processing unit 1 after determining that the terminal has re-entered the region whose map information for route determination result providing has been transmitted. When determining that the terminal has re-entered the region whose map information for route determination result providing has been transmitted (in step S361), the processing unit 1 performs route determination (in step S362) and provides route determination results (in step S363).

As previously mentioned, in accordance with this embodiment, when determining that the version of the map information about a region including the current position of the terminal differs from that of the map information about a next region to which the terminal will move while route determination results are provided, the map information processing apparatus stops the following route guidance. This is because the map information processing apparatus cannot provide proper route guidance when a new version of map information exists together with an old version of map information. Because a display of the route can be carried out by using coordinates information included in the map information for route determination even when different versions of map information for route determination and map information for route determination result providing are used for the same region, the map information processing apparatus doesn't stop the display of the route.

In addition, after thus disabling connection information and then stopping the route guidance, the map information processing apparatus can carry out route determination and route determination result providing again when the terminal has entered a region whose most up-to-date map information for route determination result providing has been transmitted to the map information processing apparatus. As a result, the map information processing apparatus can restart the route guidance.

Embodiment 8

Figure 38:
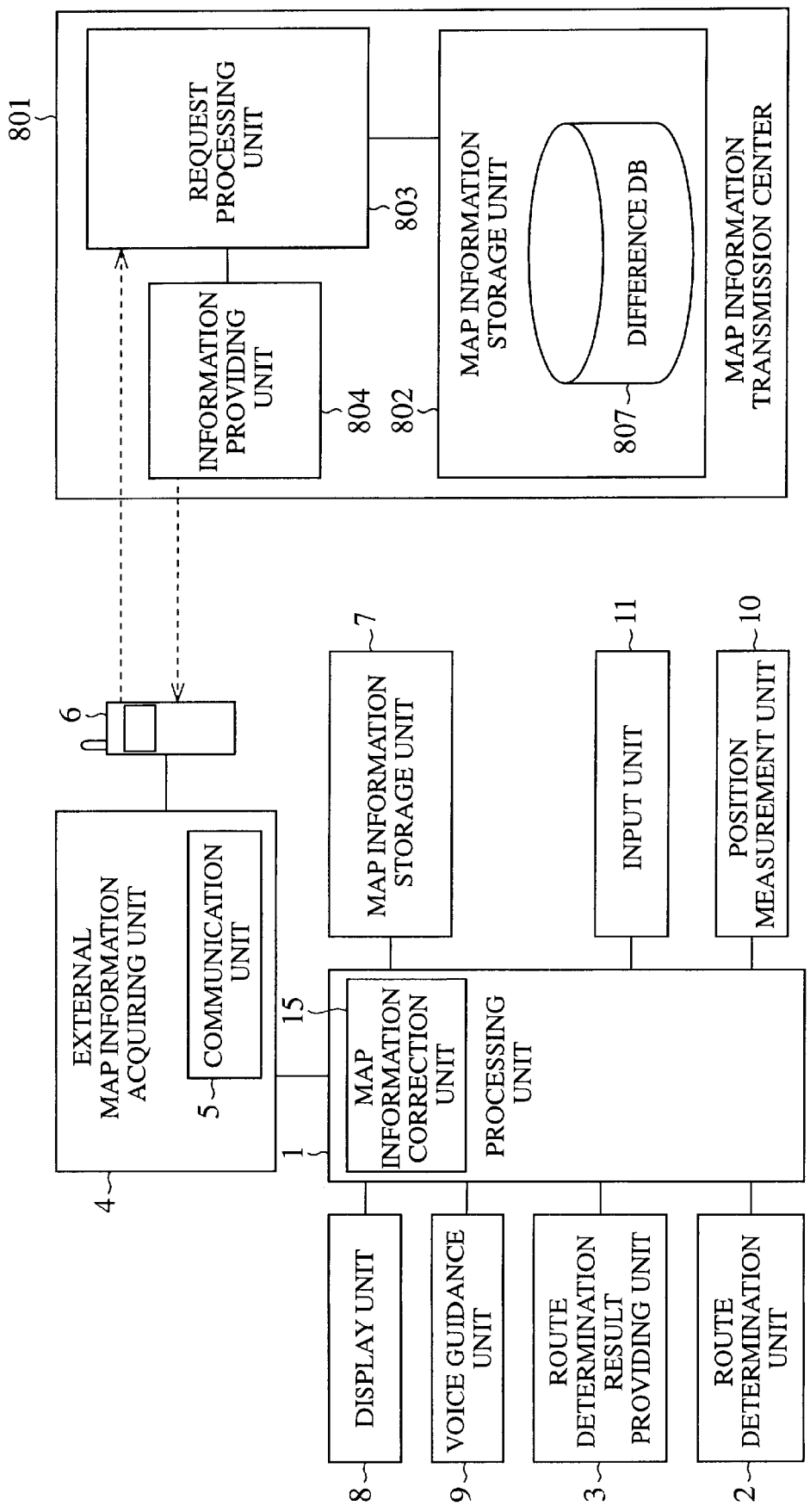
FIG. 38 is a block diagram showing the structures of a map information processing apparatus and a map information transmission center according to embodiment 8 of the present invention.

FIG. 38 is a block diagram showing the structures of a map information processing apparatus and a map information transmission center according to embodiment 8 of the present invention. In the figure, the same reference numerals as shown in FIG. 1 denote the same components as those of above-mentioned embodiment 1 or like components. Reference numeral 15 denotes a map information correction unit, and reference numeral 807 denotes a difference database (referred to as a difference DB from here on).

In accordance with this embodiment 8, correction map information used to make a correction to map information held by a map information storage unit 7 of the map information processing apparatus is transmitted from the map information transmission center 801 to the map information processing apparatus. For example, difference map information which is a difference between the map information held by the map information processing apparatus and the most up-to-date map information is used as the correction map information. The difference map information can further include associated information, e.g., map information which the difference map information accompanies. In the map information transmission center 801, the correction map information (referred to as the difference map information from here on) is held in the difference DB 807 of a map information storage unit 802. In the map information processing apparatus, the map information correction unit 15 makes a correction to the map information stored in the map information storage unit 7 by using the difference map information acquired from the map information transmission center 801 so as to generate the most up-to-date map information. As a result, it is possible to greatly reduce the amount of data transmitted from the map information transmission center 801 to the map information processing apparatus.

Figure 39:
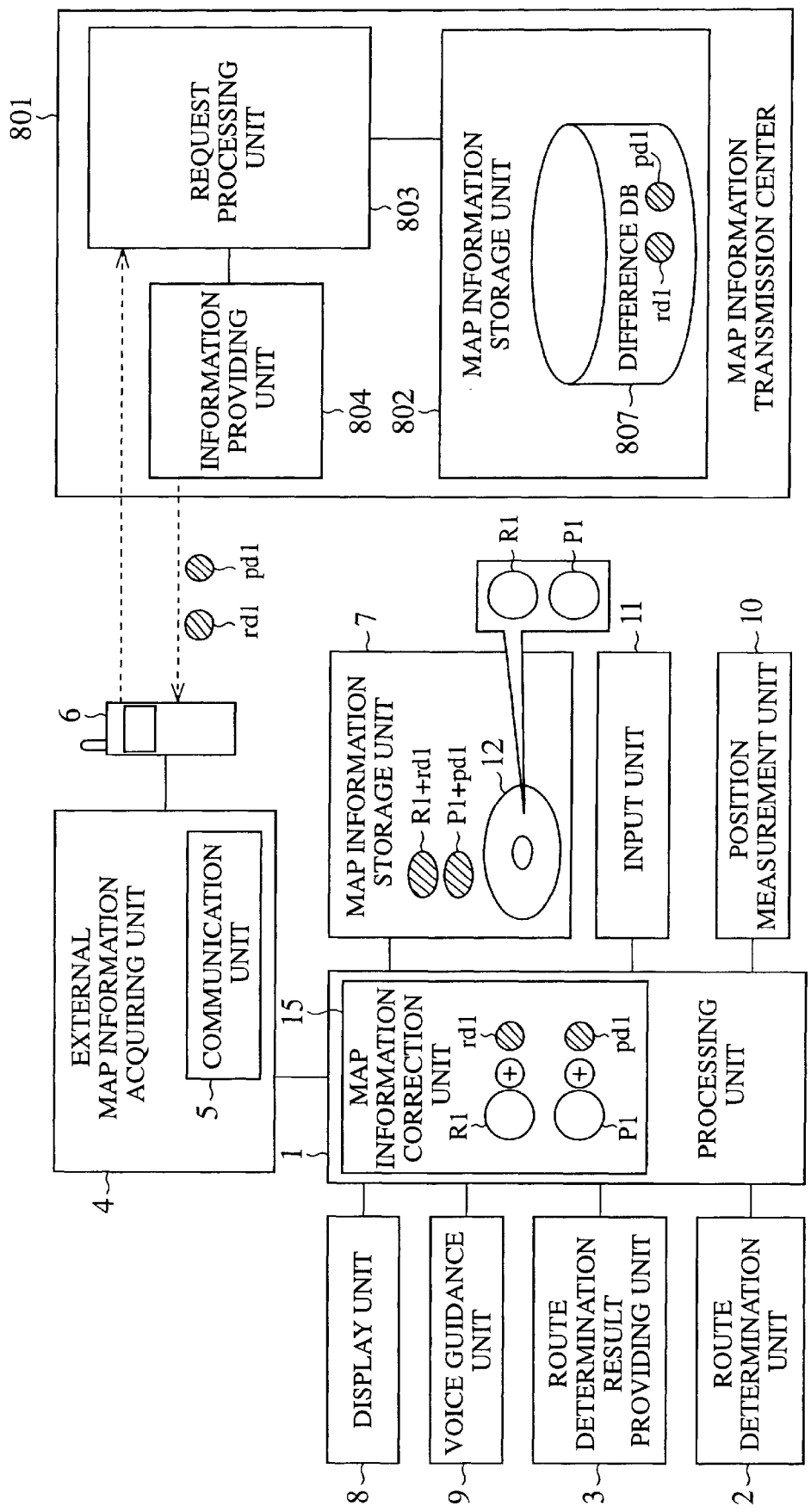
FIG. 39 is a diagram for explaining an operation of the map information processing apparatus according to embodiment 8 of the present invention.

FIG. 39 shows a flow of the difference data. In FIG. 39, the same reference numerals as shown in FIG. 12 denote the same components as those of above-mentioned embodiment 1 or like components. In FIG. 39, the same reference numerals as shown in FIG. 14 also denote the same components. Reference character R1 denotes map information for route determination recorded in a DVD-ROM, reference character P1 denotes map information for route determination result providing recorded in the DVD-ROM, reference character rd1 denotes difference map information which is a difference between R1 and the most up-to-date map information for route determination, reference character pd1 denotes difference map information which is a difference between P1 and the most up-to-date map information for route determination result providing, reference character R1+rd1 denotes the most up-to-date map information for route determination which is a combination of R1 and rd1 generated by the map information correction unit 15, and reference character P1+pd1 denotes the most up-to-date map information for route determination result providing which is a combination of P1 and pd1 generated by the map information correction unit 15.

As in the case of above-mentioned embodiment 1, the difference map information rd1 for route determination transmitted from the map information transmission center 801 to the map information processing apparatus is the combination of the difference map information for route determination about one unit region at the top of a hierarchy including a requested region and the difference map information for route determination about all unit regions that exist at lower levels of the hierarchy, and the difference map information pd1 for route determination result providing is the difference map information for route determination result providing about a region-of an arbitrary size corresponding to the requested region.

Next, a description will be made as to an operation of the system according to this embodiment with reference to flow charts of FIG. 40 and FIG. 41. When sending a request for transmission of the map information about a requested region to the map information transmission center 801, the map information processing apparatus also transmits the version of the map information held in the DVD-ROM thereof or the like to the map information transmission center 801. The map information transmission center 801 has the difference DB in the map information storage unit 802 thereof. The difference DB 807 has correction map information used for making a correction to one or more versions of map information so as to generate the latest version of map information. For example, the difference DB has difference map information which is a difference between each of a plurality of versions of map information and the latest version of map information for each of the plurality of versions of map information, and is so constructed that arbitrary difference map information can be searched for with version information about the version of target map information which is compared with the latest version of map information.

Figure 40:
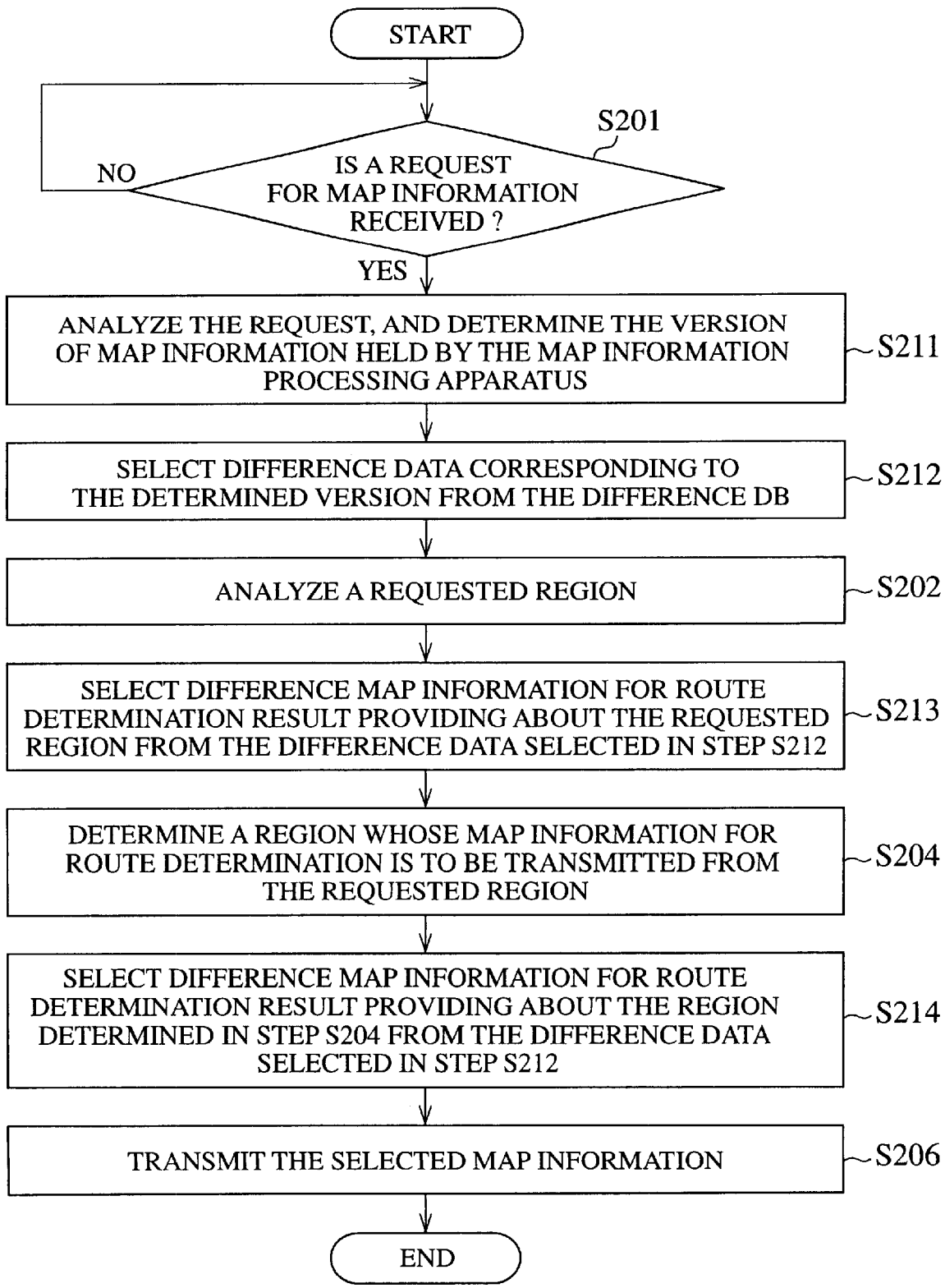
FIG. 40 is a flow chart showing an operation of the map information transmission center according to embodiment 8 of the present invention.
Figure 41:
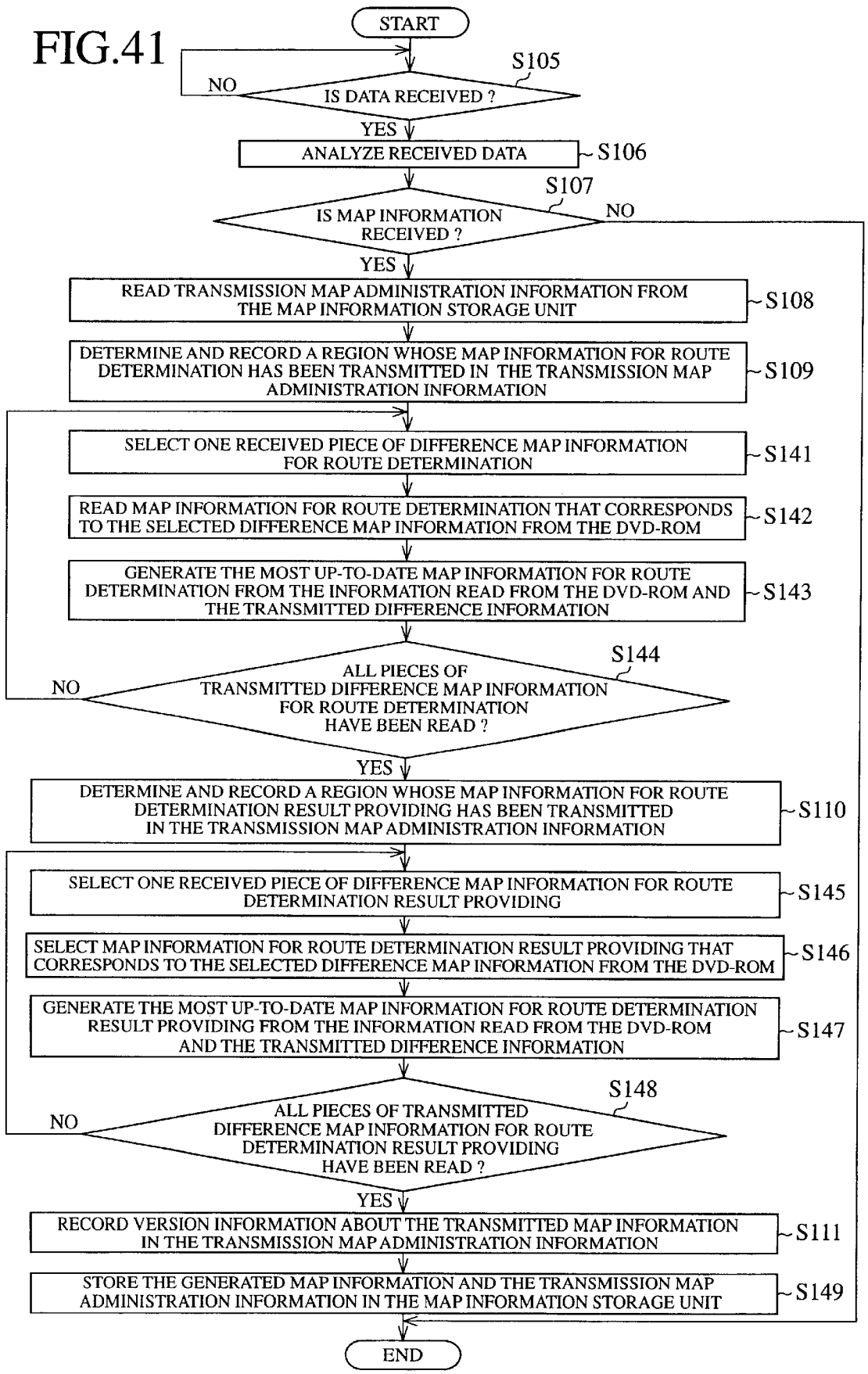
FIG. 41 is a flow chart for explaining an operation of the map information processing apparatus according to embodiment 8 of the present invention.

As shown in FIG. 40, when receiving a request for transmission of map information, the map information transmission center 801 analyzes the request (in step S201), determines the version of the map information held by the map information processing apparatus which has made the request (in step S211), and selects the difference data that corresponds to the determined version from the difference DB (instep S212). After that, the map information transmission center 801 analyzes the requested region, selects the difference map information for route determination and the difference map information for route determination result providing which correspond to the requested region from the selected difference data (in steps S202, S213, S204, and S214), and transmits them to the map information processing apparatus (in step S206).

In the map information processing apparatus, the map information correction unit 15 of the processing unit 1 reads the map information for route determination and the map information for route determination result providing that respectively correspond to the difference map information for route determination and the difference map information for route determination result providing transmitted thereto from the DVD-ROM. The map information correction unit 15 then makes a correction to each map information read out of the DVD-ROM by combining it and the corresponding transmitted difference map information so as to generate the most up-to-date map information. In other words, as shown in FIG. 41, upon reception of data from the map information transmission center 801 (instep S105) when placed in a data reception waiting state, the map information processing apparatus analyzes the contents of the received data (in step S106) and determines whether it has received the desired map information (in step S107). When the map information processing apparatus has not received the desired map information, it finishes the updating of map information. When the map information processing apparatus has received the desired map information, it reads transmission map administration information used for managing the region of the transmitted map information from the map information storage unit 7 (in step S108). The map information processing apparatus then determines the region of the received map information for route determination and writes information about the region in the transmission map administration information (in step S109). Next, the map information processing apparatus selects one piece of received difference map information for route determination (in step S141), and reads the map information for route determination that corresponds to the selected difference map information for route determination from the DVD-ROM (in step S142). The map information processing apparatus then generates the most up-to-date map information from the read map information and the transmitted difference map information (in step S143). The map information processing apparatus then performs this processing on all of remaining pieces of difference map information for route determination transmitted thereto. The map information processing apparatus also performs the same processing on each of all pieces of difference map information for route determination result providing transmitted thereto so as to generate the most up-to-date map information (in steps S110 and S145 to S148). In addition, the map information processing apparatus reads version information that each transmitted map information accompanies and writes it in the transmission map administration information (in step S111). The map information processing apparatus then stores the generated most up-to-date map information and the transmission map administration information in which the version information has been written in the map information storage unit 7 (in step S149) and finishes the updating of map information.

In a variant of this embodiment 8, the map information processing apparatus can be provided with a range-to-range movement prediction unit 14 and a communication unit 5, like those according to embodiments 5 and 6. The range-to-range movement prediction unit 14 can predict that the terminal will reach a region whose correction map information has not been transmitted to the map information processing apparatus before reaching the region, so that the map information processing apparatus can acquire necessary correction map information from the map information transmission center. Therefore, when the terminal has entered the region, the map information processing apparatus can smoothly provide desired map information for users.

Furthermore, when arbitrary next regions have different versions of map information, the map information processing apparatus can disable connection information about a connection between one of the next regions whose map information has been corrected and another one of them whose map information has not been corrected, for example, like that of embodiment 7. This variant offers the same advantages as provided by embodiment 7.

Embodiment 9

Figure 42:
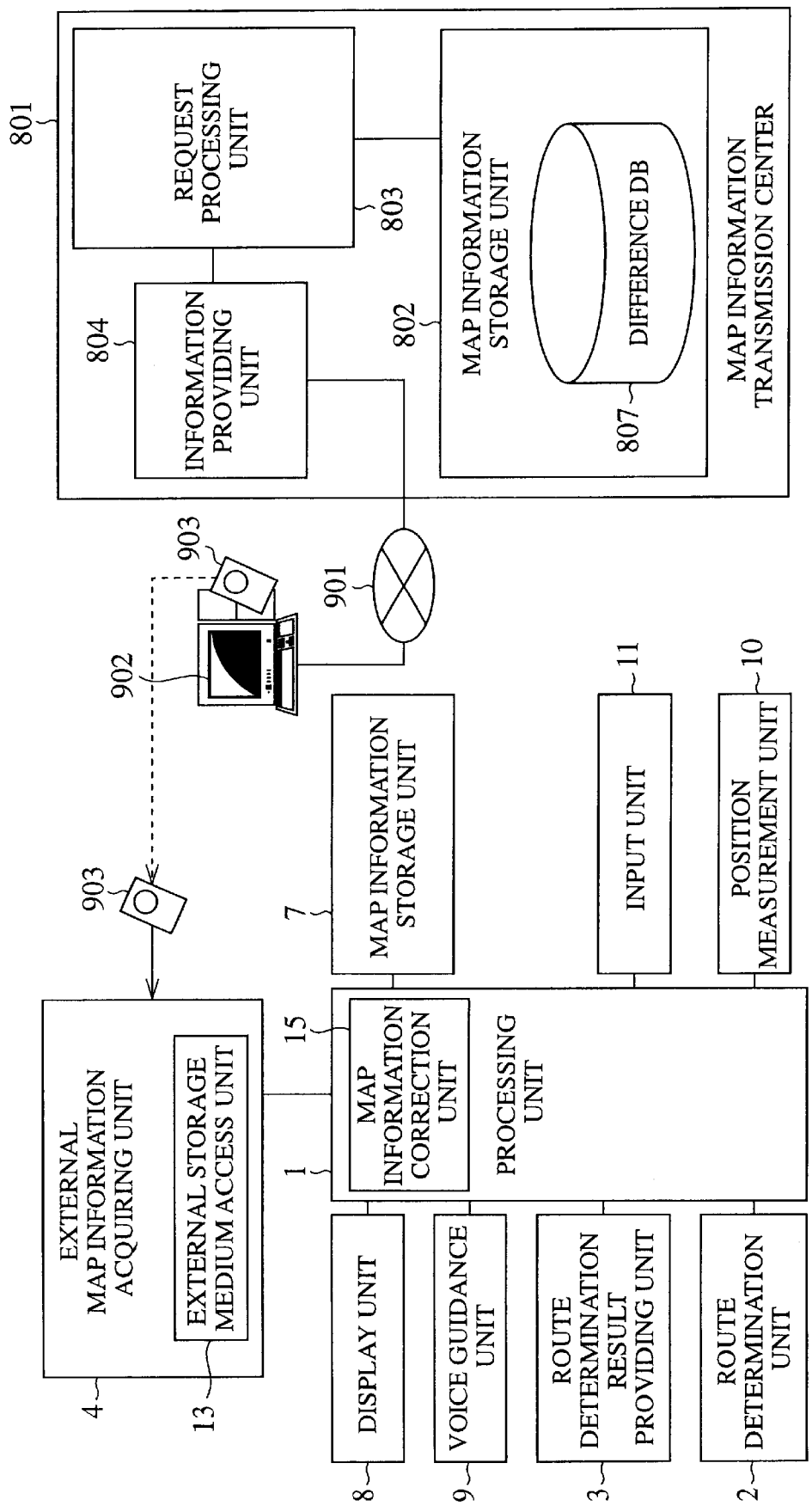
FIG. 42 is a block diagram showing the structures of a map information processing apparatus and a map information transmission center according to embodiment 9 of the present invention.

FIG. 42 is a block diagram showing the structures of a map information processing apparatus and a-map information transmission center according to embodiment 9 of the present invention. In accordance with this embodiment 9, difference map information mentioned in embodiment 8 is transmitted to the map information processing apparatus by a personal computer 902 disposed independently of the map information processing apparatus, as in the case of embodiment 3. The transmitted difference map information is furnished to the map information processing apparatus by using a PC card 903.

Thus users are allowed to use the most up-to-date map information without communication cost. Furthermore, it is possible to greatly reduce the amount of data transmitted to the map information processing apparatus.

Embodiment 10

Figure 43:
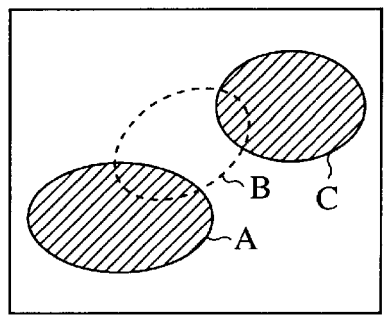
FIGS. 43A to 43D are diagrams for explaining an operation of a map information processing apparatus according to embodiment 10 of the present invention.
Figure 43:
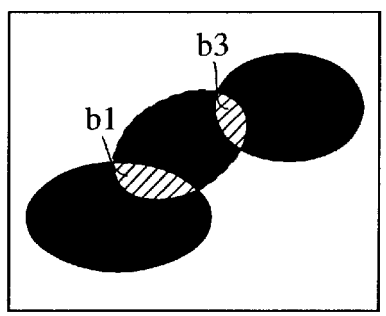
Figure 43:
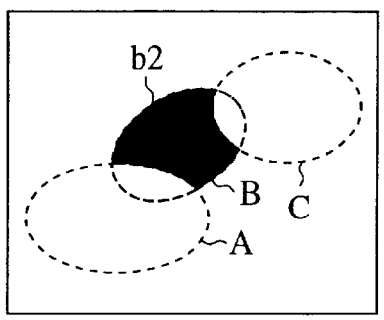
Figure 43:
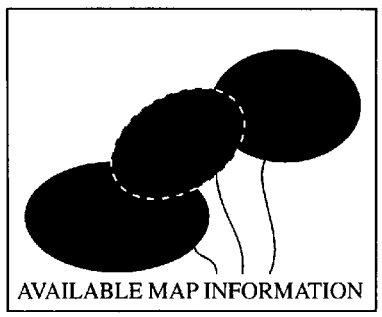

FIGS. 43A to 43D are diagrams for explaining an operation of a map information processing apparatus according to embodiment 10 of the present invention, and FIG. 43A is a diagram showing an initial state of use of map information. As for hatched regions A and C of FIG. 43A, the most up-to-date map information for route determination or the most up-to-date map information for route determination result providing into which difference map information acquired from outside the map information processing apparatus is combined is recorded in a hard disk drive disposed in a map information storage unit 7. As for other regions, map information for route determination or map information for route determination result providing which has not been updated to a higher version by using difference map information is recorded in the hard disk drive.

In this situation, a user makes a request for the difference map information about a region B enclosed by a dotted line. The difference map information about the region B transmitted from outside the map information processing apparatus is used to update the map information about the region B which has not been updated to the most up-to-date map information. Therefore, when a map information correction unit 15 combines the difference map information about the region B transmitted thereto and previous map information about the region B so as to upgrade the previous map information, because the map information about each of regions b1 and b3 where the region B overlaps the regions A and C, respectively, has already been updated to the most up-to-date map information by using the corresponding difference map information about each of the regions A and C, as shown in FIG. 43B, the map information processing apparatus generates wrong map information and malfunctions when using this map information.

To work around this problem, as shown in FIG. 43C, the map information correction unit 15 has to apply the difference map information about a region b2 that doesn't overlap the regions A and C, which is extracted from the transmitted difference map information about the region B, to the previous map information about the region B so as to generate the most up-to-date map information. As a result, as shown in FIG. 43D, the map information processing apparatus can be prevented from malfunctioning because the map information about an area that consists of the regions A, B, and C, which is available in the map information processing apparatus, can be correctly updated to the most up-to-date map information.

Figure 44:
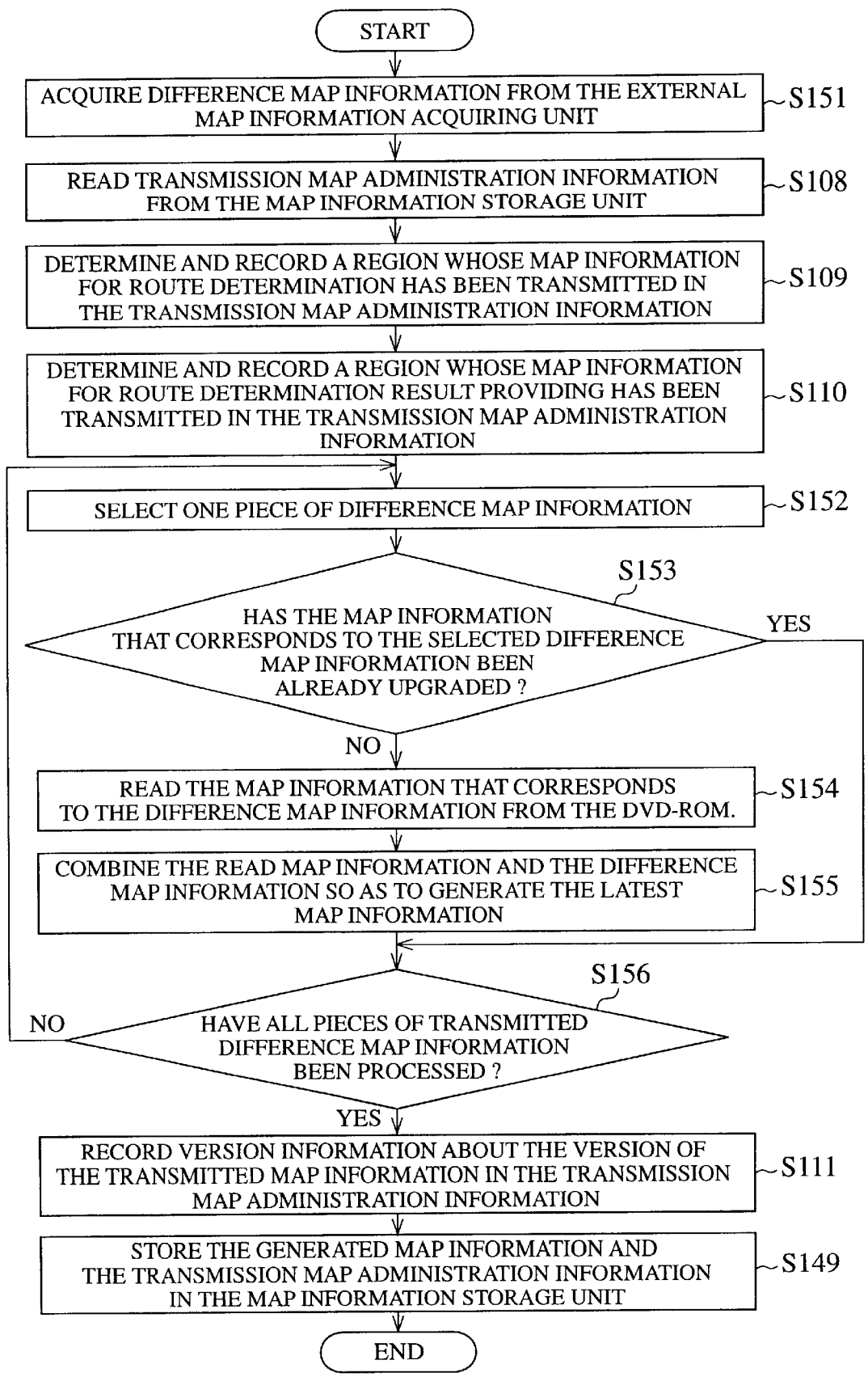
FIG. 44 is a flow chart showing a procedure for making a correction to an overlapping region in the map information processing apparatus according to embodiment 10 of the present invention.

FIG. 44 is a flow chart showing a procedure for preventing the map information processing apparatus according to this embodiment 10 from malfunctioning because of overlapping of regions whose difference map information has been transmitted to the map information processing apparatus. When the map information processing apparatus acquires difference map information from outside the map information processing apparatus by using an external map information acquiring unit 4 (in step S151), the map information processing apparatus reads transmission map administration information used for managing the regions whose map information has been transmitted thereto from a map information storage unit 7 (in step S108). Next, the map information processing apparatus determines the region associated with each transmitted difference map information (i.e., each transmitted difference map information for route determination) and writes information about the region in the transmission map administration information (in step S109). Similarly, the map information processing apparatus determines the region associated with each transmitted difference map information (i.e., each transmitted difference map information for route determination result providing) and writes information about the region in the transmission map administration information (in step S110). In general, the transmitted difference map information consists of plural pieces of difference map information about a plurality of unit regions that don't overlap one another. In other words, it can be considered that the transmitted difference map information is divided into plural pieces of difference map information about a plurality of unit regions. The map information processing apparatus, in step S152, selects one piece of difference map information corresponding to one unit region from among these pieces of difference map information, and determines whether the map information that corresponds to the selected difference map information has already been upgraded by using the difference map information (in step S153). The map information processing apparatus then advances to step S156 if the map information that corresponds to the selected difference map information has already been upgraded. In contrast, unless the map information that corresponds to the selected difference map information has already been upgraded, the map information processing apparatus reads the map information about the region that corresponds to the difference map information from the DVD-ROM (in step S154). The map information processing apparatus then combines the read map information and the difference map information so as to generate the most up-to-date map information (in step S155). The map information processing apparatus performs this processing on each of all remaining pieces of transmitted difference map information (in step S156).

The map information processing apparatus further reads version information that the transmitted map information accompanies, and writes it in the transmission map administration information (in step S111). The map information processing apparatus then stores the generated map information and the transmission map administration information in which the writing of the version information is ended in the map information storage unit 7 (in step S149) and finishes the updating of the map information.

In a variant of this embodiment 10, the map information processing apparatus can be provided with a range-to-range movement prediction unit 14 and a communication-unit 5, like those according to embodiments 5 and 6. The range-to-range movement prediction unit 14 can predict that the terminal will reach a region whose correction map information has not been transmitted to the map information processing apparatus before reaching the region, so that the map information processing apparatus can acquire necessary correction map information from the map information transmission center. Therefore, when the terminal has entered the region, the map information processing apparatus can smoothly provide desired map information for users.

Embodiment 11

Figure 45:
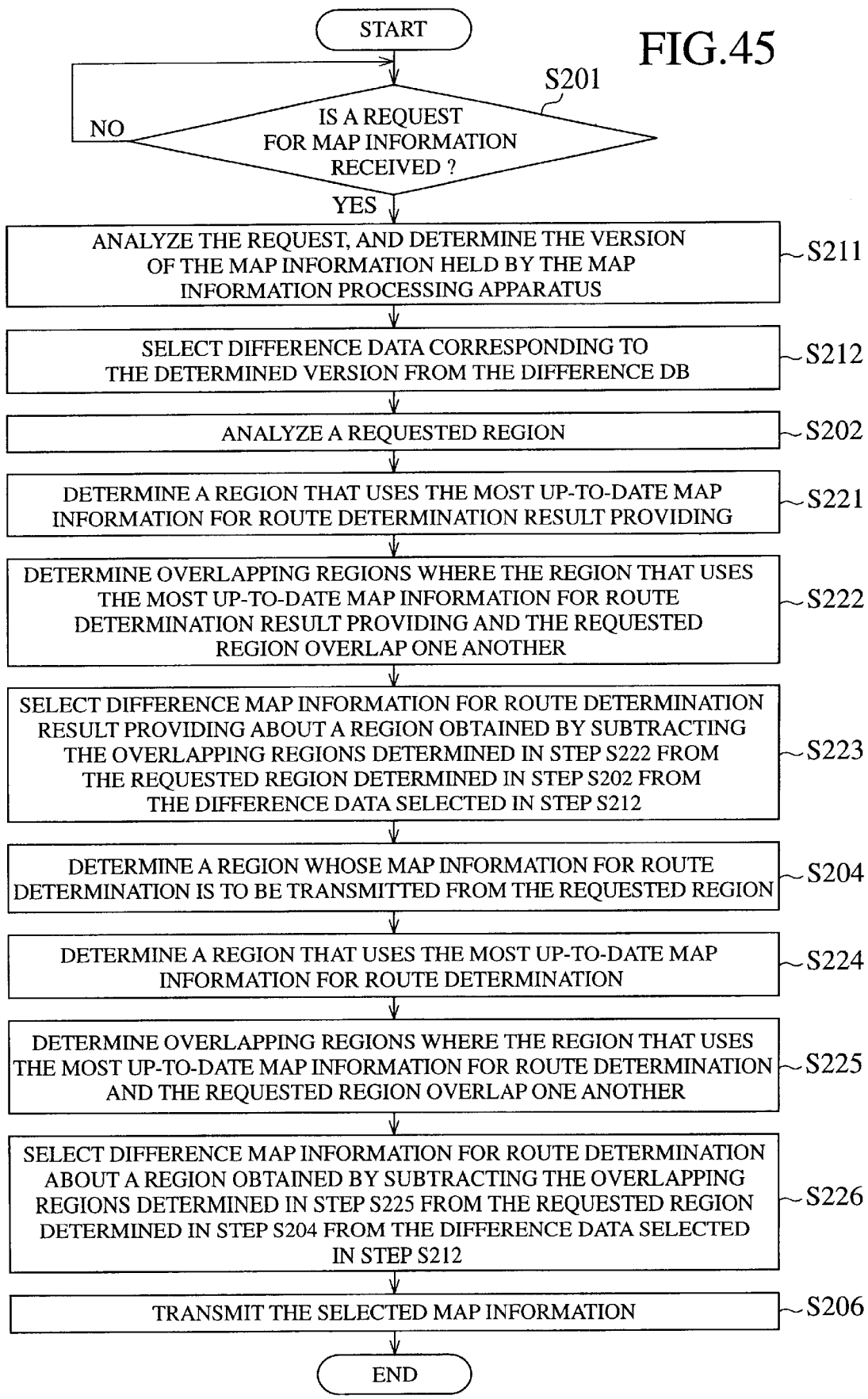
FIG. 45 is a flow chart showing a procedure for making a correction to an overlapping region of a map information transmission center according to embodiment 11 of the present invention.
Figure 46:
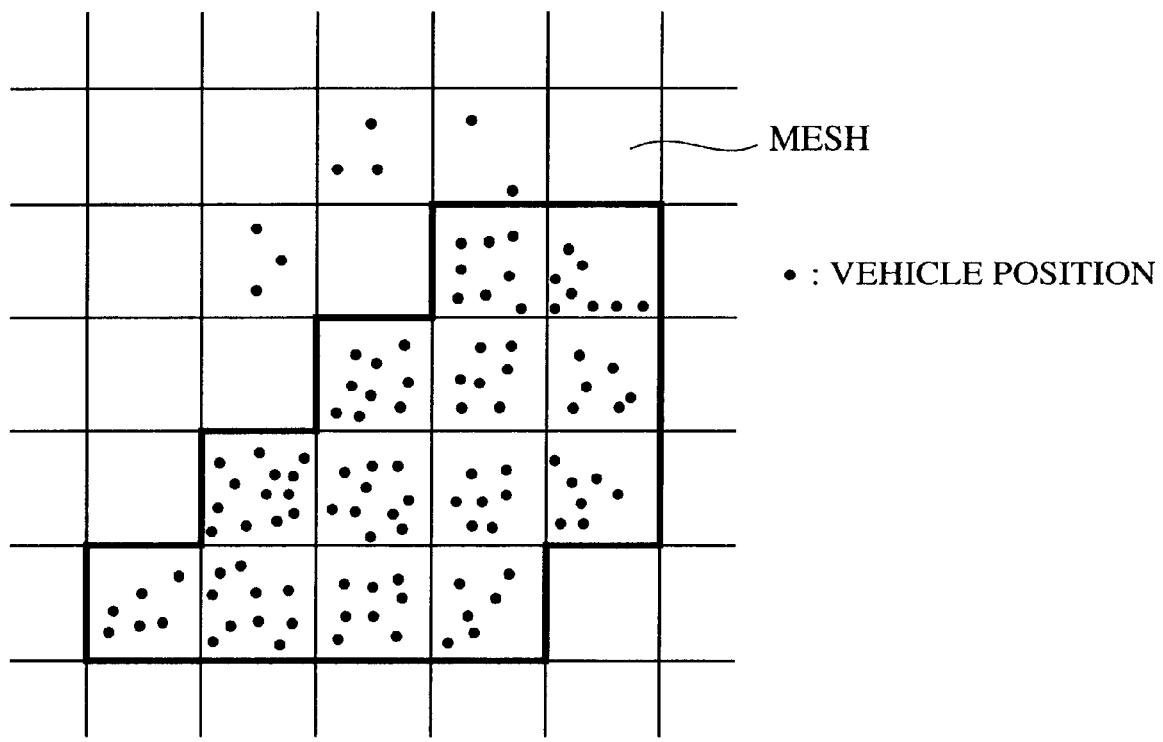
FIG. 46 is a diagram for explaining an operation of a prior art map information processing apparatus.

FIG. 45 is a flow chart showing an operation of a map information transmission center according to embodiment 11 of the present invention. In accordance with this embodiment 11, in the structure of above-mentioned embodiment 10, the map information transmission center performs a process of removing overlapping regions from a requested region on behalf of a map information processing apparatus, and then transmits difference map information from which map information about overlapping regions are removed to the map information processing apparatus.

Every request for map information made by the map information processing apparatus includes map information about regions whose difference map information has already been transmitted to the map information processing apparatus and that use the most up-to-date map information. In accordance with this embodiment, the map information transmission center can determine one or more overlapping regions in which a current requested region and regions that have already used the most up-to-date map information overlap one another by performing the following processing and can transmit difference map information about a region obtained by subtracting the overlapping regions from the requested region.

As shown in FIG. 45, when receiving a request for transmission of map information (in step S201), the map information transmission center 801 analyzes the request, determines the version of the map information held by the map information processing apparatus which has made the request (in step S211), and selects difference data that corresponds to this version from a difference DB (in step S212). Next, the map information transmission center 801 analyzes a requested region (in step S202), determines regions whose most up-to-date map information for route determination result providing has already been transmitted to the map information processing apparatus (in step S221), and then determines overlapping regions in which those regions determined in step S221 and the requested region overlap one another (in step S222). The map information transmission center 801 then selects difference map information for route determination result providing about a region obtained by subtracting the overlapping regions determined in step S222 from the requested region determined in step S202 from the difference data selected in step S212 (in step S223). Next, the map information transmission center 801 determines a region whose map information for route determination is to be transmitted from the requested region (in step S204), determines regions whose most up-to-date map information for route determination has already been transmitted to the map information processing apparatus (in step S224), and then determines one or more overlapping regions in which those regions determined in step S224 and the region determined in step S204 overlap one another (in step S225). The map information transmission center 801 then selects difference map information for route determination about a region obtained by subtracting the overlapping regions determined in step S225 from the region determined in step S204 from the difference data selected in step S212 (in step S226). The map information transmission center 801 then transmits the selected difference map information for route determination result providing and the selected difference map information for route determination to the map information processing apparatus (in step S206).

Many widely different embodiments of the present invention may be constructed without departing from the spirit and scope of the present invention. It should be understood that the present invention is not limited to the specific embodiments described in the specification, except as defined in the appended claims.

What is claimed is:

1. A map information processing apparatus comprising:
    route determination means for determining a route between two arbitrary points by using map information for route determination having one or more levels of hierarchy;
    route determination result providing means for providing route determination results obtained by said route determination means by using map information for route determination result providing; and
    external map information acquiring means for, when acquiring map information about a predetermined region from outside said map information processing apparatus, acquiring map information for route determination result providing having information about a region of an arbitrary size, including said predetermined region, and map information for route determination about at least one unit region including the predetermined region, which is included in map information for route determination at a top level of the hierarchy, and map information for route determination about all unit regions that exist at levels of the hierarchy lower than the unit region, including the predetermined region.

2. The map information processing apparatus according to claim 1, further comprising position measurement means for measuring a current position of the map information processing apparatus, region-to-region movement prediction means for determining whether the measured position reaches a boundary between two unit regions defined in the map information for route determination result providing having information about a map including the position measured, and communication means for acquiring map information from outside said map information processing apparatus.

3. The map information processing apparatus according to claim 2, further comprising means for, when map information about a region including a current position of said map information processing apparatus has a version different from that of map information about a next region, disabling connection information about a connection between the map information of both regions and the map information about the next region.

4. The map information processing apparatus according to claim 3, further comprising means for determining if the current position has entered a region having a new version of map information from another region having an old version of map information.

5. The map information processing apparatus according to claim 1, further comprising means for, when map information about a region including a current position of said map information processing apparatus has a version different from that of map information about a next region, disabling connection information about a connection between the map information of both regions and the map information about the next region.

6. The map information processing apparatus according to claim 5, further comprising means for determining if the current position has entered a region having a new version of map information from another region having an old version of map information.

7. A map information processing apparatus comprising:
    route determination means for determining a route between two arbitrary points by using map information for route determination having one or more levels of hierarchy;
    route determination result providing means for providing route determination results obtained by said route determination means by using map information for route determination result providing;
    map information storage means for storing the map information for route determination and the map information for route determination result providing;
    map information correction means for making a correction to map information, including information about a predetermined region, which is included in the map information held by said map information storage means; and
    external map information acquiring means for, when acquiring correction map information used for making a correction to the map information including information about the predetermined region from outside said map information processing apparatus, acquiring map information for route determination result providing having information about a region of an arbitrary size including the predetermined region, and map information for route determination about at least one unit region including the predetermined region, which is included in map information for route determination at a top level of the hierarchy, and map information for route determination about all unit regions that exist at levels of the hierarchy lower than the unit region including the predetermined region.

8. The map information processing apparatus according to claim 7, further comprising position measurement means for measuring a current position of the map information processing apparatus, region-to-region movement prediction means for determining whether the measured position reaches a boundary between two unit regions defined in said map information for route determination result providing having information about a map including the measured position, and communication means for acquiring map information from outside said map information processing apparatus.

9. The map information processing apparatus according to claim 8, further comprising means for, when map information about a region including a current position of said map information processing apparatus has a version different from that of map information about a next region, disabling connection information about a connection between the map information of both regions and the map information about the next region.

10. The map information processing apparatus according to claim 9, further comprising means for determining if the current position has entered a region having a new version of map information, from another region having an old version of map information.

11. The map information processing apparatus according to claim 7, further comprising means for, when map information about a region including a current position of said map information processing apparatus has a version different from that of map information about a next region, disabling connection information about a connection between the map information of both regions and the map information about the next region.

12. The map information processing apparatus according to claim 11, further comprising means for determining if the current position has entered a region having a new version of map information, from another region having an old version of map information.

13. The map information processing apparatus according to claim 7, wherein said map information correction means makes a correction to the map information by removing one or more already-corrected regions from the correction map information acquired.

14. The map information processing apparatus according to claim 13, further comprising position measurement means for measuring a current position of the map information processing apparatus, region-to-region movement prediction means for determining whether the measured position reaches a boundary between two unit regions defined in the map information for route determination result providing having information about a map including the position measured, and communication means for acquiring map information from outside said map information processing apparatus.

15. The map information processing apparatus according to claim 14, further comprising means for, when map information about a region including a current position of said map information processing apparatus has a version different from that of map information about a next region, disabling connection information about a connection between the map information of both regions and the map information about the next region.

16. The map information processing apparatus according to claim 15, further comprising means for determining if the current position has entered a region having a new version of map information from another region having an old version of map information.

17. The map information processing apparatus according to claim 13, further comprising means for, when map information about a region including a current position of said map information processing apparatus has a version different from that of map information about a next region, disabling connection information about a connection between the map information of both regions and the map information about the next region.

18. The map information processing apparatus according to claim 17, further comprising means for determining if the current position has entered a region having a new version of map information from another region having an old version of map information.

19. A map information transmission center comprising:

map information storage means for storing map information for route determination having one or more levels of hierarchy and map information for route determination result providing;

map request processing means for processing a request for map information from outside said map information transmission center; and information providing means for providing map information for outside said map information transmission center, wherein, when receiving a request for map information about a predetermined region from outside said map information transmission-center, said map request processing means reads map information for route determination result providing having information about a region of an arbitrary size, including the predetermined region, and map information for route determination about at least one unit region including said predetermined region, which is included in map information for route determination at a top level of the hierarchy, and map information for route determination about all unit regions that exist at lower levels of the hierarchy than the unit region from said map information storage means, and delivers the map information read to said information providing means.

20. A map information transmission center comprising:

map information storage means for storing correction map information used for making a correction to one or more versions of map information, each version including map information for route determination having one or more levels of hierarchy and map information for route determination result providing;

map request processing means for processing a request for map information from outside said map information transmission center; and information providing means for providing map information for outside said map information transmission center, wherein, when receiving a request for map information about a predetermined region from outside said map information transmission center, said map request processing means reads both correction map information used for making a correction to map information for route determination result providing having information about a region of an arbitrary size including the predetermined region and correction map information used for making a correction to both map information for route determination about at least one unit region including the predetermined region, which is included in map information for route determination at a top level of the hierarchy, and map information for route determination about all unit regions that exist at levels of the hierarchy lower than the unit region from said map information storage means, and delivers the correction map information to said information providing means.

21. The map information transmission center according to claim 20, wherein said map request processing means transmits the correction map information from which information about already-corrected regions has already been removed to said information providing means for making a correction to each of the map information for route determination result providing and the map information for route determination.

* * * * *